US011962257B2

United States Patent
Kawai et al.

(10) Patent No.: US 11,962,257 B2
(45) Date of Patent: *Apr. 16, 2024

(54) TECHNIQUE FOR SUPPRESSING DECREASE IN FLOW RATE OF AIR DISCHARGED FROM BLOWER

(71) Applicant: MAKITA CORPORATION, Anjo (JP)

(72) Inventors: Yuki Kawai, Anjo (JP); Naoya Asami, Anjo (JP)

(73) Assignee: MAKITA CORPORATION, Anjo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 17/897,624

(22) Filed: Aug. 29, 2022

(65) Prior Publication Data

US 2023/0075030 A1 Mar. 9, 2023

(30) Foreign Application Priority Data

Sep. 3, 2021 (JP) .................................. 2021-144115
Aug. 23, 2022 (JP) .................................. 2022-132825

(51) Int. Cl.
*H02K 7/14* (2006.01)
*F04D 25/06* (2006.01)
*H02P 7/22* (2006.01)
*H02P 7/29* (2016.01)
*H02P 29/10* (2016.01)
*H02P 29/40* (2016.01)

(52) U.S. Cl.
CPC .............. *H02P 29/10* (2016.02); *F04D 25/06* (2013.01); *H02P 7/22* (2013.01); *H02P 7/29* (2013.01); *H02P 29/40* (2016.02)

(58) Field of Classification Search
CPC .. H02P 29/10; H02P 29/40; H02P 7/22; H02P 7/29; H02P 2006/045
See application file for complete search history.

(56) References Cited

U.S. PATENT DOCUMENTS

2023/0065201 A1\* 3/2023 Takeda ...................... H02P 6/16

FOREIGN PATENT DOCUMENTS

CN 114653683 A \* 6/2022 ........... F04D 19/002
JP 2021-076098 A 5/2021

\* cited by examiner

*Primary Examiner* — Karen Masih
(74) *Attorney, Agent, or Firm* — Oliff PLC

(57) ABSTRACT

A blower in one aspect of the present disclosure includes: a housing including a first discharge port; a motor in the housing; a fan in the housing; an attachment fitting portion; and a motor drive circuit. The attachment fitting portion is configured to detachably attach, to the first discharge port, an attachment including a second discharge port. The motor drive circuit (i) delivers a designated power to the motor and (ii) performs a constant power control that maintains a magnitude of an electric power delivered to the motor at a magnitude of the designated power.

20 Claims, 15 Drawing Sheets

TECHNIQUE FOR SUPPRESSING DECREASE IN FLOW RATE OF AIR DISCHARGED FROM BLOWER

CROSS-REFERENCE TO RELATED APPLICATIONS

The present application claims the benefit of Japanese Patent Application No. 2021-144115 filed on Sep. 3, 2021 with the Japan Patent Office and Japanese Patent Application No. 2022-132825 filed on Aug. 23, 2022 with the Japan Patent Office, the entire disclosure of Japanese Patent Application No. 2021-144115 and the entire disclosure of Japanese Patent Application No. 2022-132825 are incorporated herein by reference.

BACKGROUND

The present disclosure relates to a blower.

Japanese Unexamined Patent Application Publication No. 2021-076098 discloses a blower that includes a motor and is configured to perform a constant rotation control for controlling the motor so as to maintain an actual rotational frequency of the motor at a desired rotational frequency.

SUMMARY

When an attachment is attached to a discharge portion of the blower, and the attachment has a discharge port that is smaller than a discharge port in the discharge portion of the blower, the smaller discharge port generates a pressure loss with respect to an airflow passing therethrough and a flow rate of an air discharged through the smaller discharge port may significantly decrease.

It is desirable that one aspect of the present disclosure can suppress a decrease in a flow rate of an air discharged from a blower with an attachment attached thereto.

One aspect of the present disclosure provides a blower that includes a housing, a motor in the housing, a fan in the housing, an attachment fitting portion, and a motor drive circuit. The housing includes a suction port and a first discharge port. The suction port and the first discharge port communicate an inside of the housing with an outside of the housing. The fan is rotationally driven by the motor to thereby generate an airflow from the suction port to the first discharge port. The attachment fitting portion detachably attaches an attachment to the first discharge port. The attachment includes a second discharge port, receives the airflow discharged through the first discharge port, and discharges the airflow through the second discharge port. The motor drive circuit delivers a designated power to the motor and performs a constant power control that maintains a magnitude of an electric power delivered to the motor at a magnitude of the designated power.

In the blower configured as mentioned above, when a pressure loss (or a pressure drop) is generated with respect to the airflow passing through (i) the first discharge port, or (ii) the first discharge port and the second discharge port, a pressure of an air downstream from the first discharge port and/or the second discharge port decreases. In response to the pressure of the air downstream decreasing, a load applied from the fan to the motor decreases. In such a circumstance, the magnitude of the electric power delivered to the motor is maintained at the magnitude of the designated power through the constant power control, and an actual rotational frequency of the motor consequently increases. In response to the actual rotational frequency increasing, the flow rate of the air increases. As a result, the blower can suppress a decrease in the flow rate of the air discharged from the blower with the attachment attached thereto.

Another aspect of the present disclosure provides a method for operating a blower, including:

attaching an attachment to a first discharge port of the blower, the attachment (i) including a second discharge port and (ii) configured to receive an airflow discharged through the first discharge port and to discharge the airflow through the second discharge port;

delivering, to a motor of the blower, an electrical power having a magnitude designated by a user of the blower, the motor being configured to rotationally drive a fan of the blower; and performing a constant power control that maintains a magnitude of the electric power delivered to the motor at the magnitude designated by the user.

The method as described above can suppress a decrease in a flow rate of an air discharged from the blower with the attachment attached thereto.

BRIEF DESCRIPTION OF THE DRAWINGS

An example embodiment of the present disclosure will be described hereinafter by way of example with reference to the accompanying drawings, in which.

DETAILED DESCRIPTION OF EXEMPLARY EMBODIMENTS

1. Overview of Embodiments

Figure 1:
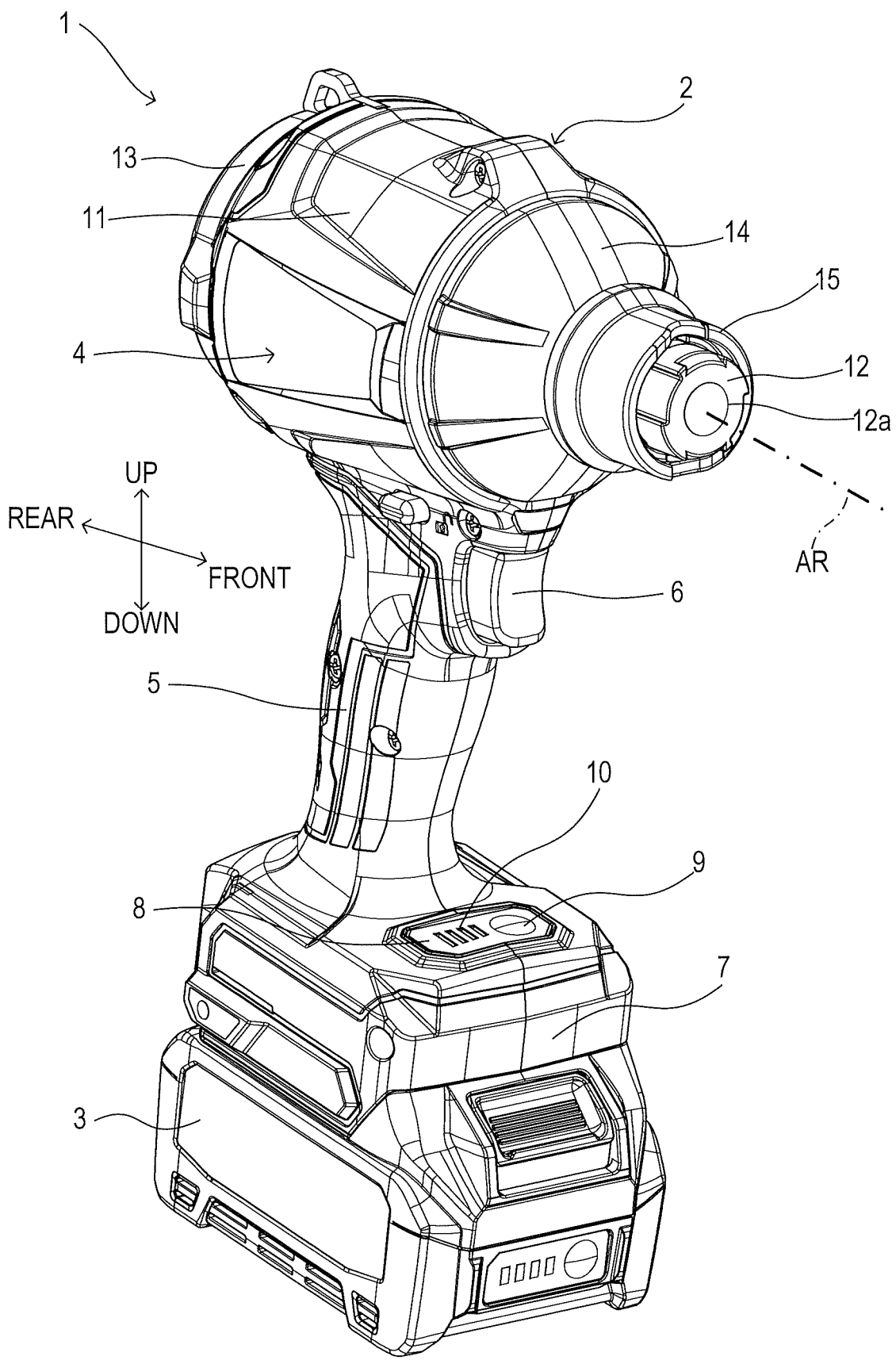
FIG. 1 is a perspective view of a blower according to an example embodiment, as seen from a diagonally upper forward position.

One embodiment may provide a blower that includes at least any one of the following features 1 through 8:

Feature 1: a housing including a suction port and a first discharge port, the suction port and the first discharge port communicating an inside of the housing with an outside of the housing;

Feature 2: a motor in the housing;

Feature 3: a fan in the housing;

Feature 4: the fan is configured to be rotationally driven by the motor to thereby generate an airflow from the suction port to the first discharge port;

Feature 5: an attachment fitting portion configured to detachably attach an attachment to the first discharge port;

Feature 6: the attachment includes a second discharge port;

Feature 7: the attachment is configured to receive the airflow discharged through the first discharge port and to discharge the airflow through the second discharge port;

Feature 8: a motor drive circuit configured (i) to deliver a designated power to the motor and (ii) to perform a constant power control that maintains a magnitude of an electric power delivered to the motor at a magnitude of the designated power.

The blower including at least the features 1 through 8 can suppress a decrease in a flow rate of an air discharged from the blower with the attachment attached thereto. The designated power may be fixed or may be variable.

One embodiment may include, in addition to or in place of at least any one of the features 1 through 8, at least any one of the following features 9 through 11:

Feature 9: a control circuit configured to output a power designating signal, the power designating signal indicating the magnitude of the designated power;

Feature 10: the motor drive circuit is configured to receive the power designating signal;

Feature 11: the motor drive circuit is configured to maintain, in the constant power control, the magnitude of the electric power delivered to the motor at the magnitude indicated by the power designating signal received.

In the blower including at least the features 1 through 11, the magnitude of the electric power delivered to the motor can be varied by the power designating signal.

One embodiment may include, in addition to or in place of at least any one of the features 1 through 11, at least any one of the following features 12 through 14:

Feature 12: a first manual switch configured to be manually moved by a user of the blower to drive the motor;

Feature 13: the control circuit is configured to vary the power designating signal in accordance with a movement of the first manual switch;

Feature 14: the motor drive circuit is configured to vary the magnitude of the electric power delivered to the motor in accordance with a variation in the power designating signal.

In the blower including at least the features 1 through 14, the user can vary, with the movement of the first manual switch, the magnitude of the electric power delivered to the motor, and can thus vary the flow rate of the air discharged from the blower.

One embodiment may include, in addition to or in place of at least any one of the features 1 through 14, at least any one of the following features 15 through 17:

Feature 15: the power designating signal is in the form of a pulse width modulation signal having an output duty ratio;

Feature 16: the control circuit is configured to vary the output duty ratio in accordance with the movement of the first manual switch;

Feature 17: the motor drive circuit is configured to vary the magnitude of the electric power delivered to the motor in accordance with a variation in the output duty ratio.

In the blower including at least the features 1 through 17, it is possible to vary, with the output duty ratio, the magnitude of the electric power delivered to the motor, and thus to vary the flow rate of the air discharged from the blower.

One embodiment may include, in addition to or in place of at least any one of the features 1 through 17, at least any one of the following features 18 through 20:

Feature 18: a second manual switch configured to be manually moved by a user of the blower to switch the blower between a first operation mode and a second operation mode;

Feature 19: the control circuit is configured to set a maximum value of the designated power to a first value in response to the blower having been switched to the first operation mode via the second manual switch;

Feature 20: the control circuit is configured to set the maximum value of the designated power to a second value in response to the blower having been switched to the second operation mode via the second manual switch, the second value being distinct from the first value.

The blower including at least the features 1 through 11, and 18 through 20 allows the user to switch, with the movement of the second manual switch, the blower between the first operation mode and the second operation mode to thereby switch the maximum value of the designated power between the first value and the second value. Consequently, the user can vary a maximum flow rate of the air discharged from the blower via the second manual switch.

One embodiment may include, in addition to or in place of at least any one of the features 1 through 20, at least any one of the following features 21 through 23:

Feature 21: a power source fitting portion configured to be detachably attached to a power source, the power source having an electric power to be delivered to the motor;

Feature 22: the control circuit is accommodated in the power source fitting portion;

Feature 23: the motor drive circuit is accommodated in the housing.

In the blower including at least the features 1 through 11, and 21 through 23, the control circuit can be arranged apart from the motor drive circuit. Thus, it is possible to inhibit the control circuit from receiving an electromagnetic interference that is generated by a current flowing from the motor drive circuit to the motor.

One embodiment may include, in addition to or in place of at least any one of the features 1 through 23, the following feature 24:

Feature 24: the power source fitting portion is configured to be detachably attached to a battery pack including the power source.

The blower including at least the features 1 through 11, and 21 through 24 can deliver the electric power from the battery pack to the motor.

One embodiment may include, in addition to or in place of at least any one of the features 1 through 24, the following feature 25:

Feature 25: the control circuit is configured to vary the power designating signal so as to reduce the magnitude of the designated power in response to an operation parameter of the motor indicating that an actual rotational frequency of the motor has reached a preset rotational frequency.

In the blower including at least the features 1 through 11, and 25, it is possible to reduce the electric power delivered to the motor, and also reduce the flow rate of the air discharged from the blower, in response to the actual rotational frequency having reached the preset rotational frequency.

One embodiment may include, in addition to or in place of at least any one of the features 1 through 25, the following feature 26:

Feature 26: the preset rotational frequency corresponds to a maximum rotational frequency permissible to the motor.

The blower including at least the features 1 through 11, 25, and 26 can suppress a failure in the motor due to an overspeed of the motor.

One embodiment may include, in addition to or in place of at least any one of the features 1 through 26, at least any one of the following features 27 through 31:

Feature 27: a rotational frequency detection circuit configured to output a rotational frequency signal based on a rotation of the motor;

Feature 28: the rotational frequency signal varies in accordance with the actual rotational frequency of the motor;

Feature 29: the control circuit is configured to receive the rotational frequency signal;

Feature 30: the control circuit is configured to detect the actual rotational frequency based on the rotational frequency signal received;

Feature 31: the operation parameter includes the actual rotational frequency.

The blower including at least the features 1 through 11, and 25 through 31 can detect the actual rotational frequency and suppress the failure in the motor due to the overspeed of the motor.

One embodiment may include, in addition to or in place of at least any one of the features 1 through 31, the following Feature 32 and/or Feature 33:

Feature 32: a motor unit in the housing;

Feature 33: the motor unit includes the motor, the motor drive circuit, and the rotational frequency detection circuit.

One embodiment may include, in addition to or in place of at least any one of the features 1 through 33, the following feature 34:

Feature 34: the attachment is in the form of a nozzle.

One embodiment may include, in addition to or in place of at least any one of the features 1 through 34, at least any one of the following features 35 through 37:

Feature 35: the first discharge port has an opening area of a first magnitude;

Feature 36: the second discharge port has an opening area of a second magnitude;

Feature 37: the second magnitude is smaller than the first magnitude.

The blower including at least the features 1 through 8, and 35 through 37 is useful to discharge the airflow to a limited space outside the blower.

One embodiment may include, in addition to or in place of at least any one of the features 1 through 37, the following feature 38:

Feature 38: the blower is in the form of a handheld blower.

The blower including at least the features 1 through 8, and 38 is easy for the user to carry.

In one embodiment, the control circuit may be integrated into a single electronic unit, a single electronic device, or a single circuit board.

In one embodiment, the control circuit may be a combination of two or more electronic circuits, of two or more electronic units, or of two or more electronic devices, each of which is individually disposed on the blower or inside the blower.

In one embodiment, the control circuit may include a microcomputer.

In one embodiment, the control circuit may include, in place of or in addition to the microcomputer, a combination of electronic components, such as discrete devices, an application specific integrated circuit (ASIC), an application specific standard product (ASSP), a programmable logic device, such as a field programmable gate array (FPGA), or any combination thereof.

Examples of the motor include a brushed DC motor, a brushless DC motor, and an AC motor.

Examples of the motor drive circuit include any forms of bridge circuits including a half-bridge circuit and a full-bridge circuit, and any forms of semiconductor switches.

One embodiment may provide a method for operating a blower, the method including at least any one of the following features 39 through 41:

Feature 39: attaching an attachment to a first discharge port of the blower, the attachment (i) including a second discharge port and (ii) configured to receive an airflow discharged through the first discharge port and to discharge the airflow through the second discharge port;

Feature 40: delivering, to a motor of the blower, an electrical power having a magnitude designated by a user of the blower, the motor being configured to rotationally drive a fan of the blower;

Feature 41: performing a constant power control that maintains a magnitude of the electric power delivered to the motor at the magnitude designated by the user.

The method including at least the features 39 through 41 can suppress a decrease in a flow rate of an air discharged from the blower with the attachment attached thereto.

In one embodiment, the features 1 through 41 may be in any combination.

In one embodiment, any of the features 1 through 41 may be omitted.

2. Specific Exemplary Embodiment

A description will be given below of a specific exemplary embodiment. This specific exemplary embodiment is merely an example, and the present disclosure is not limited to this embodiment and may be implemented in any forms.

2-1. Schematic Structure

Figure 2:
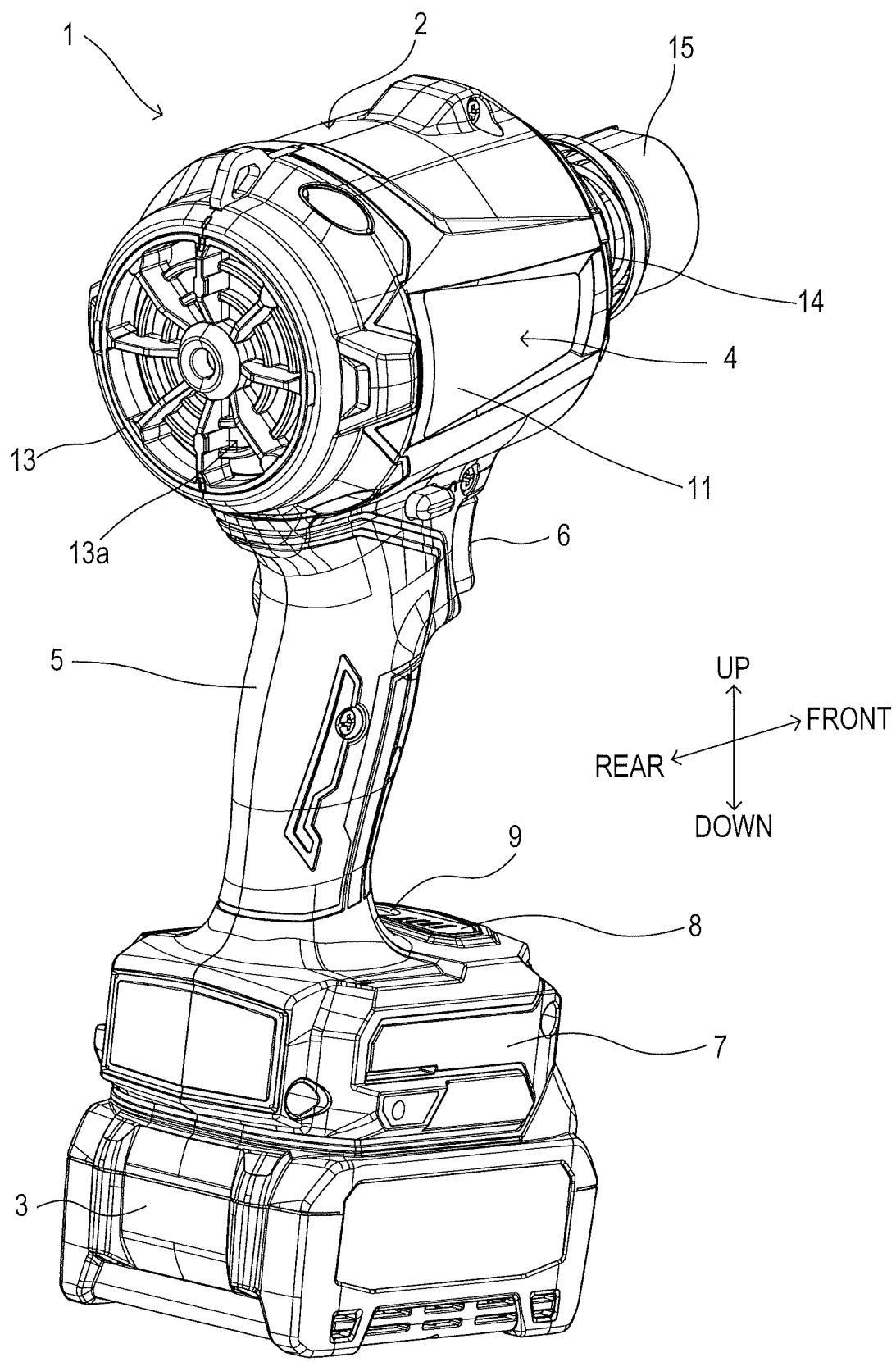
FIG. 2 is a perspective view of the blower, as seen from a diagonally upper rearward position.

As shown in FIGS. 1 and 2, the present embodiment gives an example of a handheld blower 1 configured to discharge an air to blow dirt, dust and the like away. The blower 1 may be referred to as an air duster in other embodiments.

The blower 1 includes a main body 2. The main body 2 includes a housing 4.

The housing 4 includes a storage 11. In the present embodiment, the storage 11 has a cylindrical shape extending along an axis AR.

The housing 4 includes a discharge portion 12. The discharge portion 12 extends along the axis AR at a position anterior to the storage 11. The discharge portion 12 has a diameter smaller than that of the storage 11. The discharge portion 12 includes a front end that has a first discharge port 12a through which an air is discharged. The axis AR runs through the first discharge port 12a.

The housing 4 includes a suction portion 13. The suction portion 13 covers an opening at a rear end of the storage 11. The suction portion 13 includes two or more first suction ports 13a that penetrate through the suction portion 13 to introduce an air outside the blower 1 into the storage 11.

The housing 4 includes a connector 14. The connector 14 is interposed between the storage 11 and the discharge portion 12, and connects the storage 11 to the discharge portion 12. The connector 14 has a shape of a funnel, and an outer diameter of the connector 14, which is perpendicular to the axis AR, gradually reduces as going from a rear end of the connector 14 toward a front end thereof.

The housing 4 includes an attachment fitting portion 15. The attachment fitting portion 15 surrounds an outer peripheral surface of the discharge portion 12.

Figure 3:
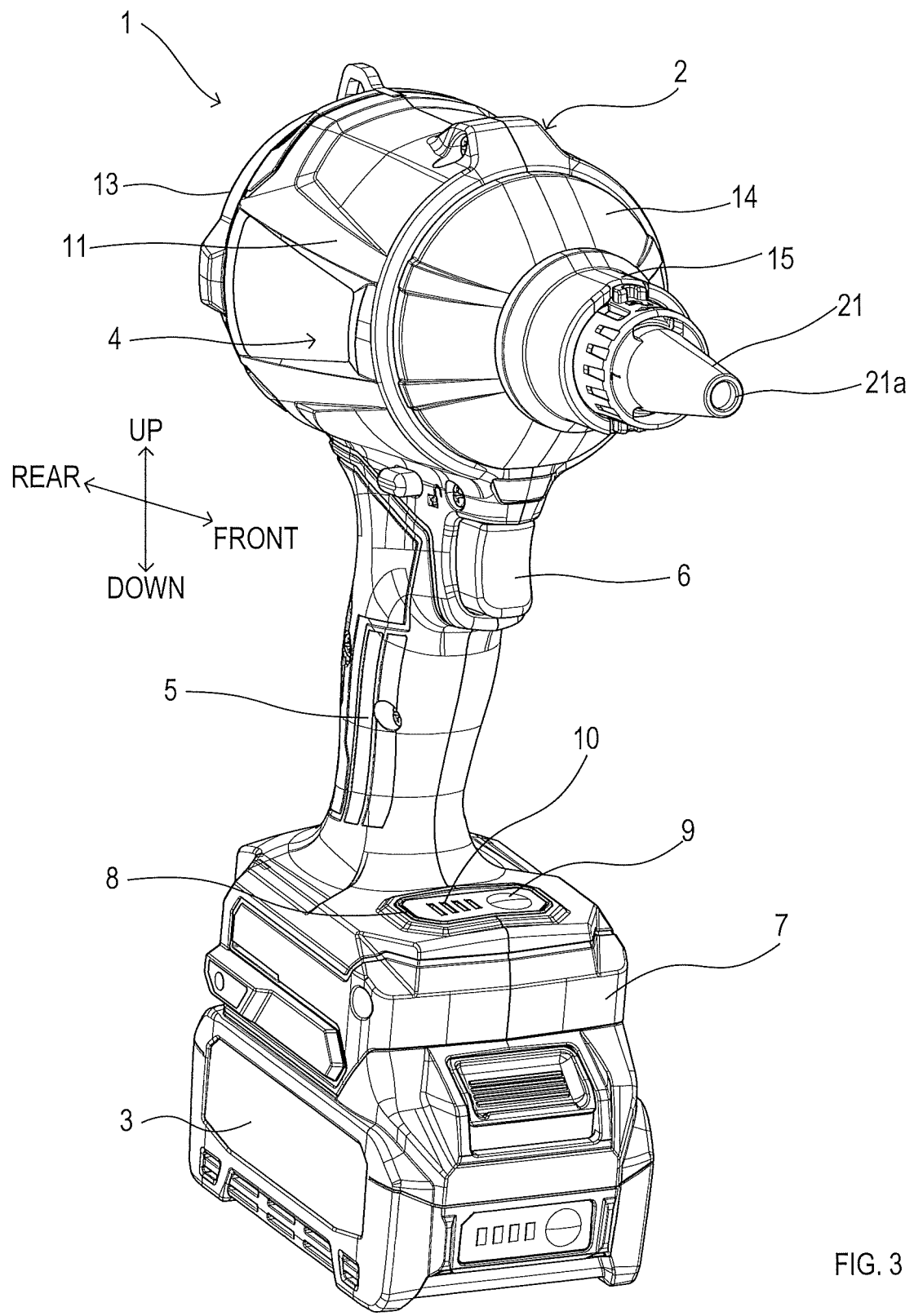
FIG. 3 is a perspective view of the blower with a nozzle attached.

As shown in FIG. 3, the attachment fitting portion 15 is configured to detachably attach an attachment 21 to the first discharge port 12a. In the present embodiment, the attachment 21 is in the form of a nozzle. In other embodiments, the attachment 21 may be an attachment in any form other than a nozzle. The attachment 21 includes a second discharge port 21a. The attachment 21 is configured to receive an airflow discharged through the first discharge port 12a and to discharge the airflow through the second discharge port 21a. The first discharge port 12a has an opening area (or an inner diameter) of a first magnitude. The second discharge port 21a has an opening area (or an inner diameter) of a second magnitude. In the present embodiment, the opening area of the second magnitude is smaller than the opening area of the first magnitude. In other embodiments, the opening area of the second magnitude may be equal to or greater than the opening area of the first magnitude.

The main body 2 includes a handgrip 5. The handgrip 5 downwardly extends from the housing 4. The handgrip 5 is formed so as to be gripped by a user of the blower 1 in one hand.

The main body 2 includes a trigger 6. The trigger 6 is arranged at an upper frontward position with respect to the handgrip 5 and is manually operated by the user to drive the blower 1. The trigger 6 is arranged so as to be pulled by a finger of the user while the handgrip 5 is gripped by the user.

The main body 2 includes a battery attachment part 7. The battery attachment part 7 is arranged at a lower end of the handgrip 5. A battery pack 3 is detachably attached to the battery attachment part 7. The battery pack 3 supplies a DC power to the main body 2.

The main body 2 includes an operation panel 8. In the present embodiment, the operation panel 8 is arranged on the battery attachment part 7.

The operation panel 8 includes a mode changeover switch 9. The mode changeover switch 9 is manually operated by the user to select operation modes of the blower 1. In the present embodiment, the mode changeover switch 9 is configured to be pressed by the user. The mode changeover switch 9 may include a tactile switch and may be in an ON state only while the user presses and holds down the mode changeover switch 9. In other embodiments, the mode changeover switch 9 may be configured to be manually slid or manually rotated by the user to select the operation modes.

The operation panel 8 includes a mode indicator 10. The mode indicator 10 is configured to indicate an operation mode selected. In the present embodiment, the mode indicator 10 includes four LEDs and is configured to individually turn on or off these LEDs to thereby indicate the operation mode selected. In other embodiments, the mode indicator 10 may include an indicator in any other form, such as a liquid crystal display (LCD), and the operation panel 8 may be arranged at any other position in the main body 2, such as on the housing 4 or on the handgrip 5.

Figure 4:
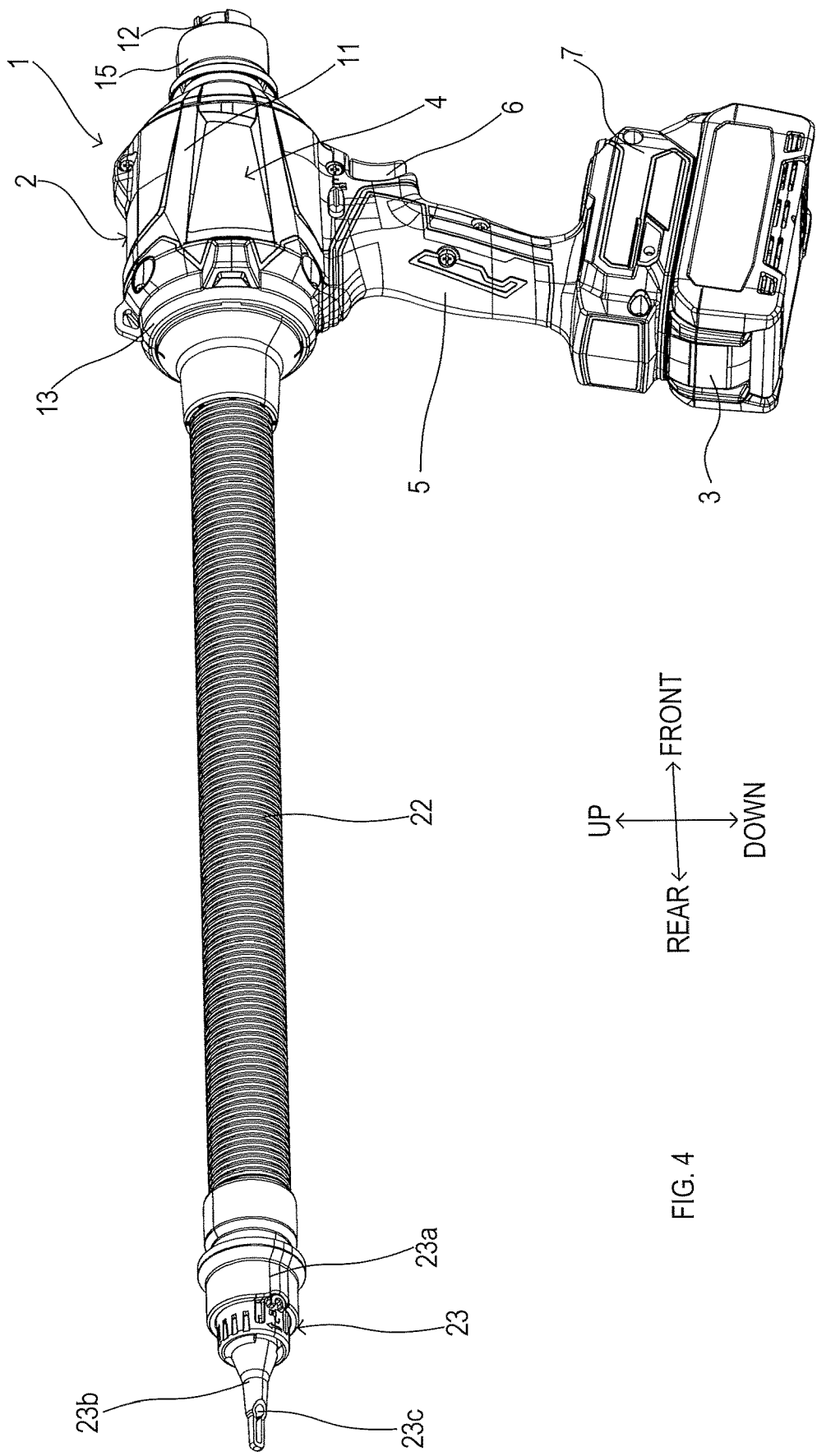
FIG. 4 is a perspective view of the blower with an air suction hose attached.

As shown in FIG. 4, the suction portion 13 of the housing 4 is configured to be detachably attached to an air suction hose 22. The air suction hose 22 includes a front end having an opening. The front end opening is configured to be attached to the suction portion 13 in such a manner that the front end opening faces the two or more first suction ports 13a. The air suction hose 22 includes a rear end having an opening. The rear end opening is connected to an air needle (or an air suction nozzle) 23. The air needle 23 is configured to be inserted into an air introduction port of a pneumatically inflated structure.

The air needle 23 includes a fitting portion 23a. The fitting portion 23a has a cylindrical shape. The fitting portion 23a includes a front end that is connected to the rear end opening of the air suction hose 22.

The air needle 23 includes an insertion portion 23b. The insertion portion 23b includes a front end that is connected to a rear end of the fitting portion 23a. The insertion portion 23b has a shape of a funnel whose diameter gradually reduces as going from the front end of the insertion portion 23b toward a rear end thereof. The rear end of the insertion portion 23b includes a second suction port 23c for introducing an air. When an air is drawn from the pneumatically inflated structure, the rear end of the insertion portion 23b (in other words, a tip of the air needle 23) is inserted into the air introduction port of the pneumatically inflated structure.

Figure 5:
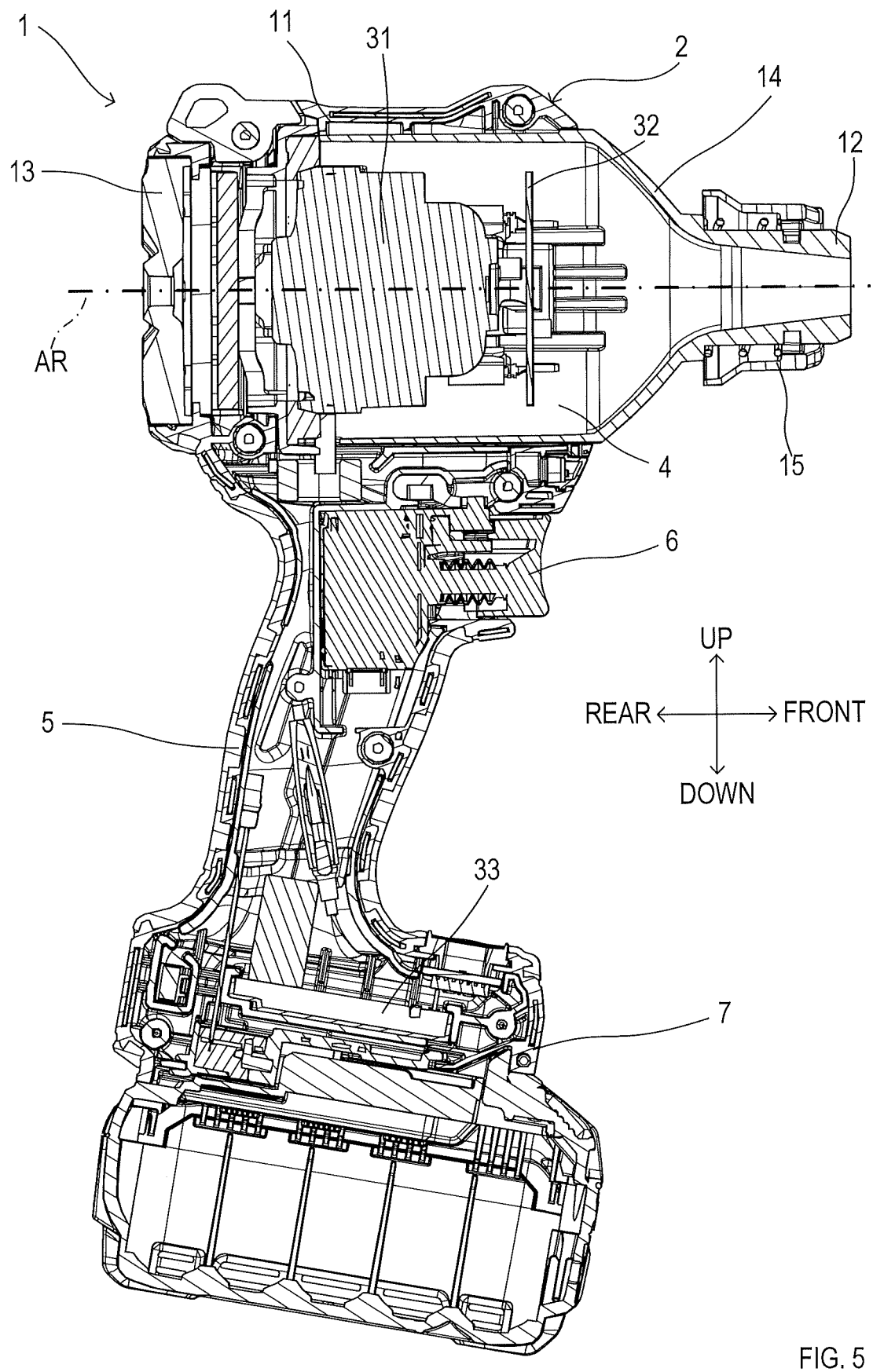
FIG. 5 is a sectional view of the blower.

As shown in FIG. 5, the storage 11 accommodates a motor unit 31 and a fan 32 therein. The motor unit 31 is a drive source for rotationally driving the fan 32. The fan 32 is connected to the motor unit 31 so as to rotate about the axis AR. The fan 32 is configured to be rotationally driven to draw (or suck) an air through the two or more first suction ports 13a and compress the drawn air and then discharge the compressed air through the first discharge port 12a. In other words, the fan 32 is configured to generate an airflow from the two or more first suction ports 13a to the first discharge port 12a.

The blower 1 includes a control board 33 for controlling the motor unit 31. In the present embodiment, the control board 33 is accommodated in the battery attachment part 7. In other embodiments, the control board 33 may be arranged at any other position in the main body 2, such as inside the housing 4 or inside the handgrip 5.

2-2. Electrical Configuration

Figure 6:
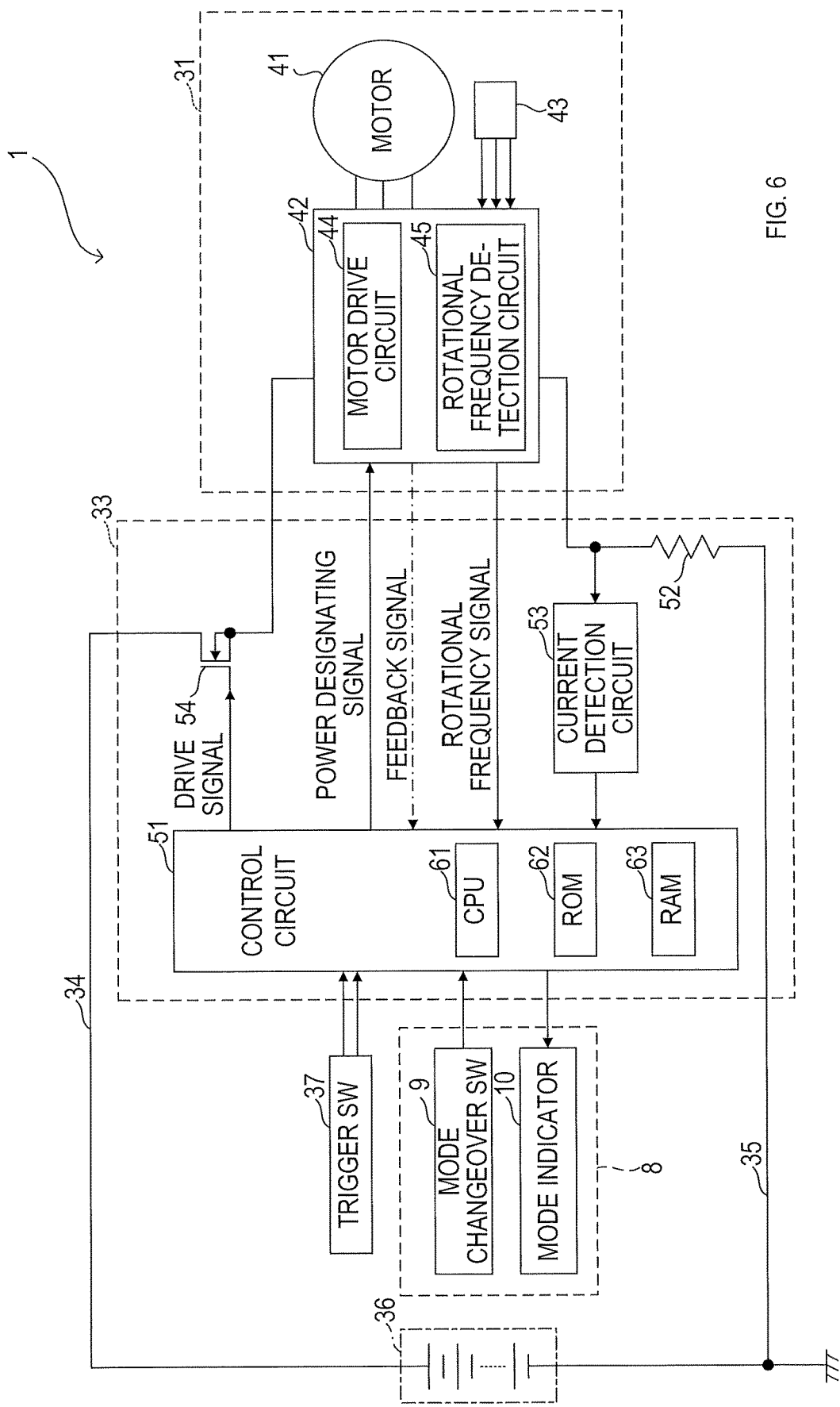
FIG. 6 is a block diagram showing an electrical configuration of the blower.

As shown in FIG. 6, the motor unit 31 includes a motor 41. In the present embodiment, the motor 41 is in the form of a three-phase brushless DC motor. In other embodiments, the motor 41 may be a motor in any other form including a single-phase brushless DC motor, a two-phase brushless DC motor, a four or more-phase brushless DC motor, a brushed DC motor, and an AC motor.

The motor unit 31 includes a drive board 42. The drive board 42 includes a motor drive circuit 44. The motor drive circuit 44 receives the DC power from a battery 36 in the battery pack 3 via a power line 34 and a ground line 35, and delivers a DC current (hereinafter, to be referred to as a drive current) to three phase windings of the motor 41, which are not shown. The power line 34 is a current path from a positive electrode of the battery 36 to the motor drive circuit 44. The ground line 35 is a current path from a negative electrode of the battery 36 to the motor drive circuit 44.

The motor drive circuit 44 receives a power designating signal output from the control board 33.

The power designating signal in the present embodiment is in the form of a pulse width modulation (PWM) signal. The power designating signal has an output duty ratio (that is, an actual duty ratio) that varies based on a magnitude of a designated power. The motor drive circuit 44 delivers, to the motor 41, a DC power (hereinafter, to be referred to as a delivered power) in accordance with the above-described power designating signal to thereby rotate the motor 41. In addition, the motor drive circuit 44 performs a constant power control that regulates a magnitude of the delivered power to be achieved to and maintained at the magnitude of the designated power. In the present embodiment, the motor drive circuit 44 performs, as the constant power control, a closed loop control (or a feedback control) for the delivered power.

Figure 7:
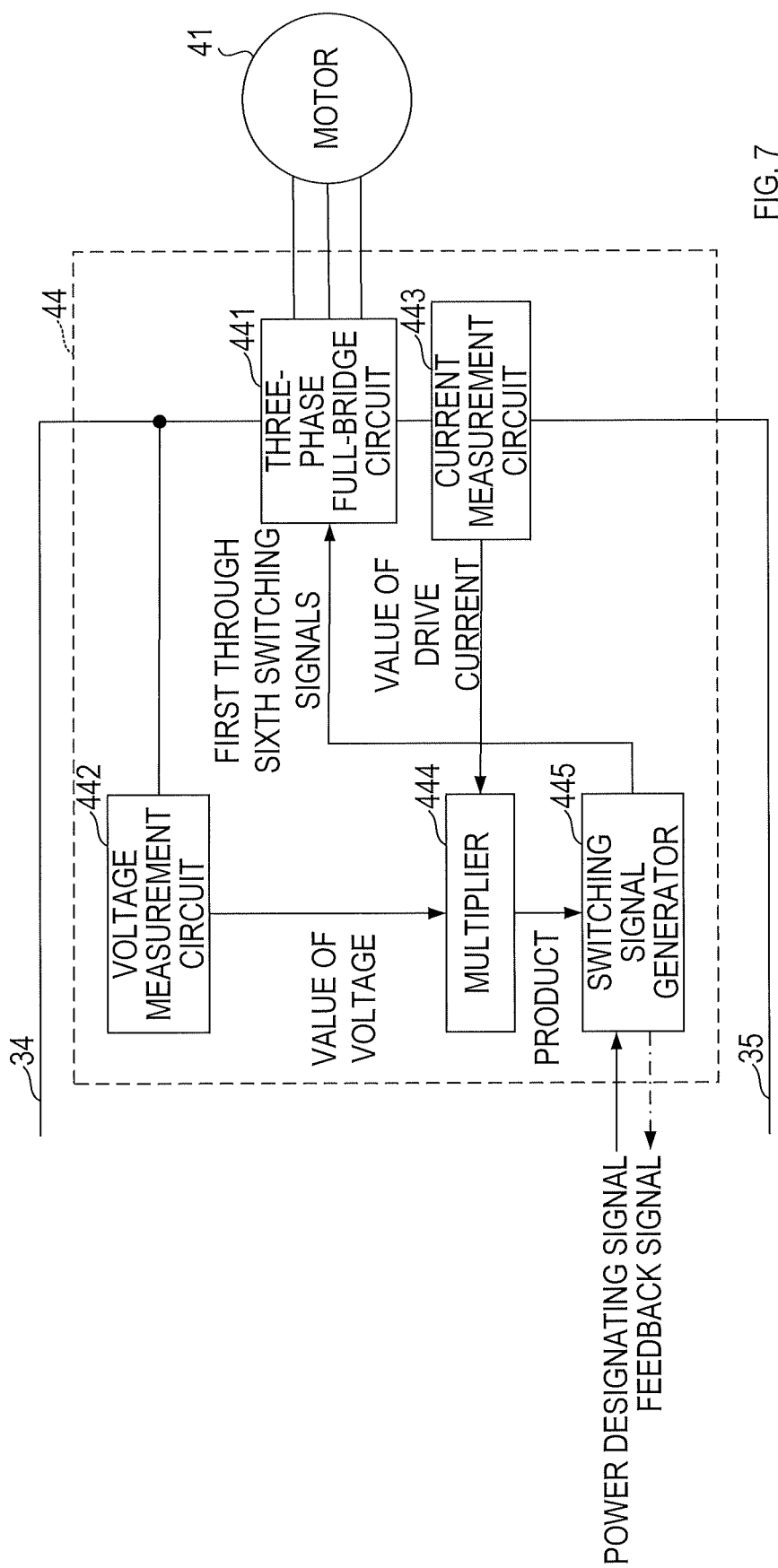
FIG. 7 is a block diagram showing a detailed circuit configuration of a motor drive circuit.

As shown in detail in FIG. 7, the motor drive circuit 44 in the present embodiment includes a three-phase full-bridge circuit 441. The three-phase full-bridge circuit 441 includes three high-side switches and three low-side switches, which are not shown. In other embodiments, the motor drive circuit 44 may include, in place of the three-phase full-bridge circuit 441, a bridge circuit in any other form (e.g. a half-bridge circuit) other than the three-phase full-bridge circuit. Alternatively, other embodiments may include, in place of the three-phase full-bridge circuit 441, a semiconductor switch in any form including a field-effect transistor (FET), a bipolar transistor, an insulated-gate bipolar transistor (IGBT), and a solid-state relay (SSR).

The motor drive circuit 44 includes a voltage measurement circuit 442. The voltage measurement circuit 442 measures a value of the voltage of the power line 34.

The motor drive circuit 44 includes a current measurement circuit 443. The current measurement circuit 443 measures a value of the drive current flowing through the ground line 35. In other embodiments, the current measurement circuit 443 may measure a value of the drive current flowing through the power line 34.

The motor drive circuit 44 includes a multiplier 444. The multiplier 444 takes (i) the value of the voltage measured by the voltage measurement circuit 442 and (ii) the value of the drive current measured by the current measurement circuit 443, and produces their product (corresponding to the magnitude of the delivered power). The multiplier 444 may be in the form of an analog multiplier or may be in the form of a digital multiplier.

The motor drive circuit 44 includes a switching signal generator 445. The switching signal generator 445 (i) receives the produced product and the power designating signal and (ii) generates first through sixth switching signals. The first through third switching signals correspond to the respective high-side switches, and turn on and off the corresponding high-side switches. The fourth through sixth switching signals correspond to the respective low-side switches, and turn on and off the corresponding low-side switches. The first through third switching signals and/or the fourth through sixth switching signals are in the form of PWM signals. The switching signal generator 445 determines a drive duty ratio in such a manner that an error between the produced product and the magnitude of the designated power indicated by the power designating signal is minimized (preferably to zero or near zero). The switching signal generator 445 generates the first through third switching signals and/or the fourth through sixth switching signals each having the drive duty ratio determined. Accordingly, the drive duty ratio affects an effective voltage applied to the motor 41. The switching signal generator 445 may be configured to output, to the control circuit 51, a feedback signal indicating the drive duty ratio, as indicated by the dashed line arrow. The switching signal generator 445 may include a microcomputer and/or a hardwired circuit. In other embodiments, the switching signal generator 445 may be integrated with the multiplier 444 and/or the three-phase full-bridge circuit 441.

The motor drive circuit 44 achieves the constant power control with the above-described circuit configuration. In other embodiments, the motor drive circuit 44 may perform the constant power control with a circuit configuration in any other form. In other embodiments, the power designating signal may be in the form of an analog signal having a variable voltage that varies based on the magnitude of the designated power. Alternatively, the power designating signal may be in the form of a serial communication signal indicating the magnitude of the designated power.

Referring back to FIG. 6, the motor unit 31 includes a rotation sensor 43. In the present embodiment, the rotation sensor 43 includes not-shown first through third hall elements corresponding to the respective phase windings of the motor 41. These hall elements generate first through third rotational position signals. Each of the first through third rotational position signals has a variable voltage that varies between HIGH and LOW in accordance with a rotational position of the motor 41 (more specifically, a rotational position of a not-shown rotor of the motor 41).

The drive board 42 includes a rotational frequency detection circuit 45. The rotational frequency detection circuit 45 receives the first through third rotational position signals, and then generates and outputs a rotational frequency signal based on the rotational position signals to the control board 33. In the present embodiment, the rotational frequency signal is in the form of a pulse train. The number of pulses included in the pulse train varies in accordance with an actual rotational frequency of the motor 41. In other embodiments, the rotational frequency signal may be a signal in any other form, such as an analog signal having a variable voltage in accordance with the actual rotational frequency of the motor 41.

The control board 33 includes a control circuit 51. In the present embodiment, the control circuit 51 is in the form of a microcomputer or a micro control unit (MCU), each of which includes a CPU 61, a ROM 62, a RAM 63, and the like. Various functions of the control circuit 51 are achieved by the CPU 61 executing a program stored in the ROM 62. Due to the execution of this program, a method corresponding to the program is performed. The ROM 62 corresponds to one example of a non-transitory tangible storage medium storing the program. In other embodiments, a part of or entire functions executed by the CPU 61 may be achieved by one or more electronic components, such as a discrete device and an integrated circuit (IC), and the control circuit 51 may include one or more additional microcomputers or one or more additional MCUs, or the control circuit 51 may be in the form of a hardwired circuit.

The control board 33 includes a shunt resistor 52. The shunt resistor 52 is arranged on the ground line 35.

The control board 33 includes a current detection circuit 53. The current detection circuit 53 outputs, to the control circuit 51, a current detection signal based on a voltage across the shunt resistor 52. The current detection signal has a variable voltage that varies in accordance with the voltage across the shunt resistor 52, that is, a magnitude of the drive current flowing through the motor 41.

The control board 33 includes a switch device 54 on the power line 34. The switch device 54 is switched between an ON state and an OFF state in accordance with a drive signal output from the control circuit 51. The switch device 54 in the ON state completes the power line 34. The switch device 54 in the OFF state interrupts the power line 34. In the present embodiment, the switch device 54 is an N-channel metal oxide semiconductor field-effect transistor (MOSFET). In other embodiments, the switch device 54 may be a semiconductor switch in any other form, such as a bipolar transistor, an IGBT, or an SSR, or may be a mechanical relay.

The blower 1 includes a trigger switch 37. The trigger switch 37 is turned on in response to the trigger 6 being pulled. The trigger switch 37 outputs a trigger-ON signal and a trigger level signal to the control circuit 51. The trigger-ON signal is a binary signal indicating whether the trigger switch 37 being turned on. The trigger level signal has a variable voltage that varies in accordance with a pulled distance of the trigger 6 (hereinafter, to be referred to as a trigger level).

In the operation panel 8, the mode changeover switch 9 outputs a mode changeover signal to the control circuit 51. The mode changeover signal is a binary signal indicating whether the mode changeover switch 9 being manually operated (in the present embodiment, whether the mode changeover switch 9 being pressed). The mode indicator 10 displays the selected operation mode on the mode indicator 10 in accordance with a display signal output from the control circuit 51. The display signal indicates the selected operation mode. In the present embodiment, the mode indicator 10 lights at least one LED that corresponds to the operation mode indicated by the display signal.

2-3. Details of Blower Control Process

Descriptions are given below of a blower control process executed by the CPU 61 of the control circuit 51. The blower control process is repeatedly executed every time a predetermined control period (for example, 1 ms) elapses.

Figure 8:
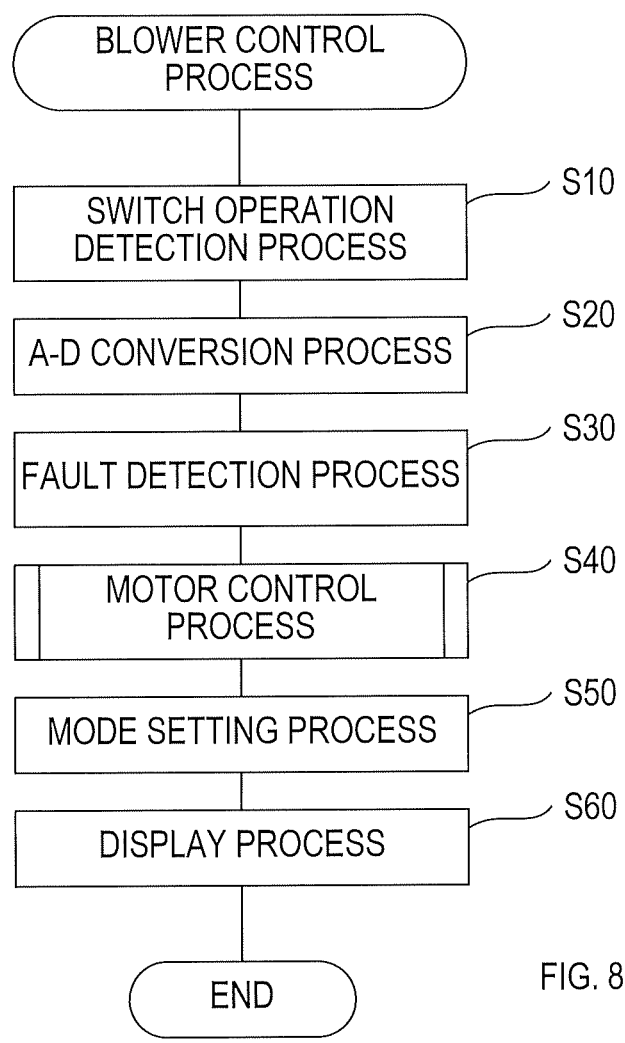
FIG. 8 is a flow chart showing a flow of a blower control process.

As shown in FIG. 8, upon the initiation of the blower control process, the CPU 61, in S10, executes a switch operation detection process. In the switch operation detection process, the CPU 61 detects whether the trigger switch 37 and the mode changeover switch 9 are in the ON state.

Subsequently, in S20, the CPU 61 executes an analog-to-digital (A-D) conversion process. In the A-D conversion process, the CPU 61 converts the variable voltage of the current detection signal from the current detection circuit 53 into a digital value and stores the digital value in the RAM 63. This digital value indicates the magnitude of the drive current flowing through the motor 41. The CPU 61 further converts the variable voltage of the trigger level signal from the trigger switch 37 into a digital value and stores the digital value in the RAM 63. This digital value indicates the trigger level.

Subsequently, in S30, the CPU 61 executes a fault detection process. In the fault detection process, the CPU 61 detects a fault, such as an occurrence of an overcurrent, based on the magnitude of the drive current obtained through the A-D conversion process in S20.

Subsequently, in S40, the CPU 61 executes a motor control process, which will be described in detail later.

Subsequently, in S50, the CPU 61 executes a mode setting process. In the mode setting process, the CPU 61 switches the operation modes of the blower 1 based on the state of the mode changeover switch 9 detected through the switch operation detection process in S10.

Subsequently, in S60, the CPU 61 executes a display process. In the display process, the CPU 61 outputs the display signal to the mode indicator 10 and displays the selected operation mode on the mode indicator 10. Upon completion of the display process, the CPU 61 finishes the blower control process.

Detailed descriptions will be given below of the motor control process executed in S40.

Figure 9A:
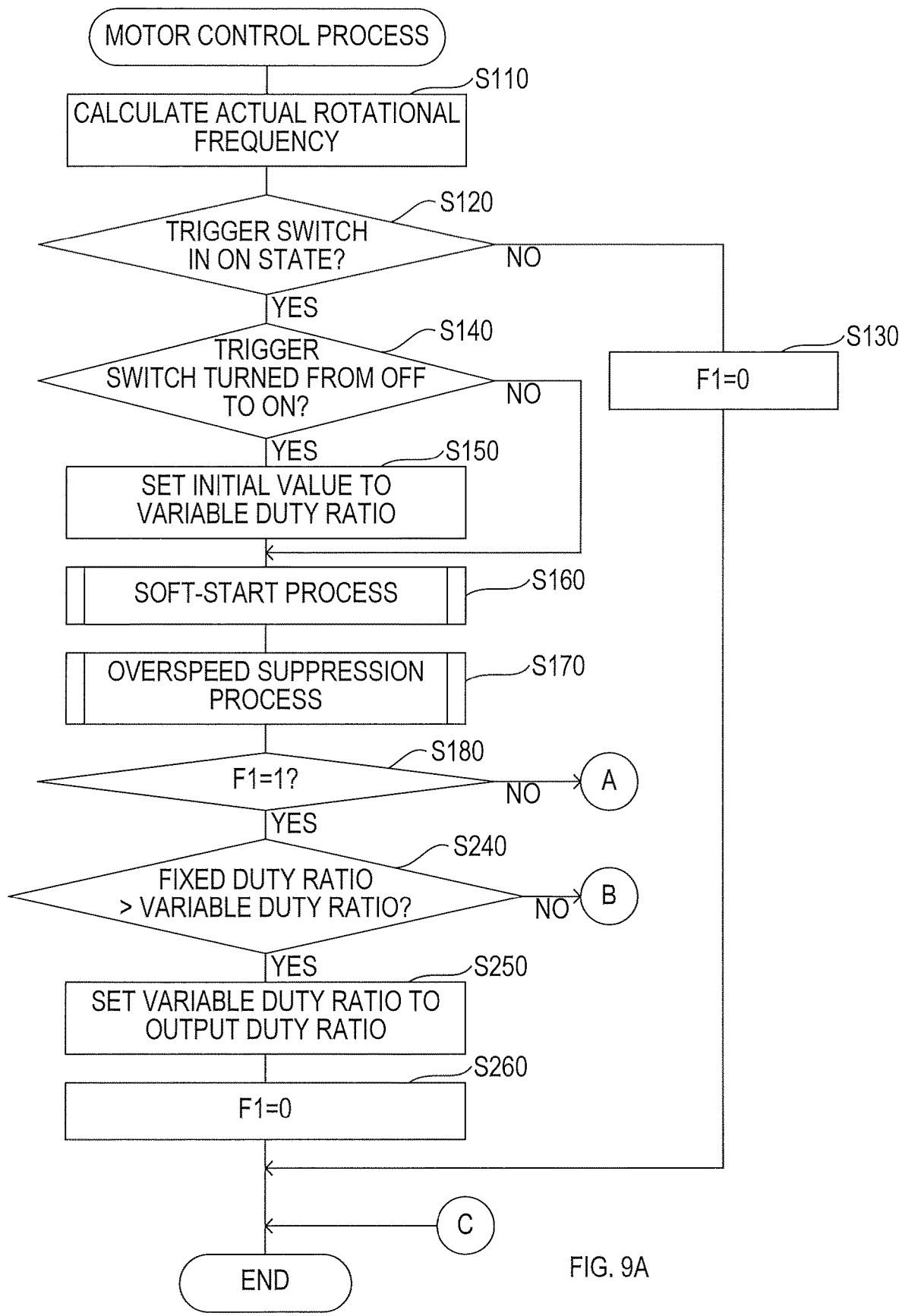
FIG. 9A is a flow chart showing a flow of a part of a motor control process.
Figure 9B:
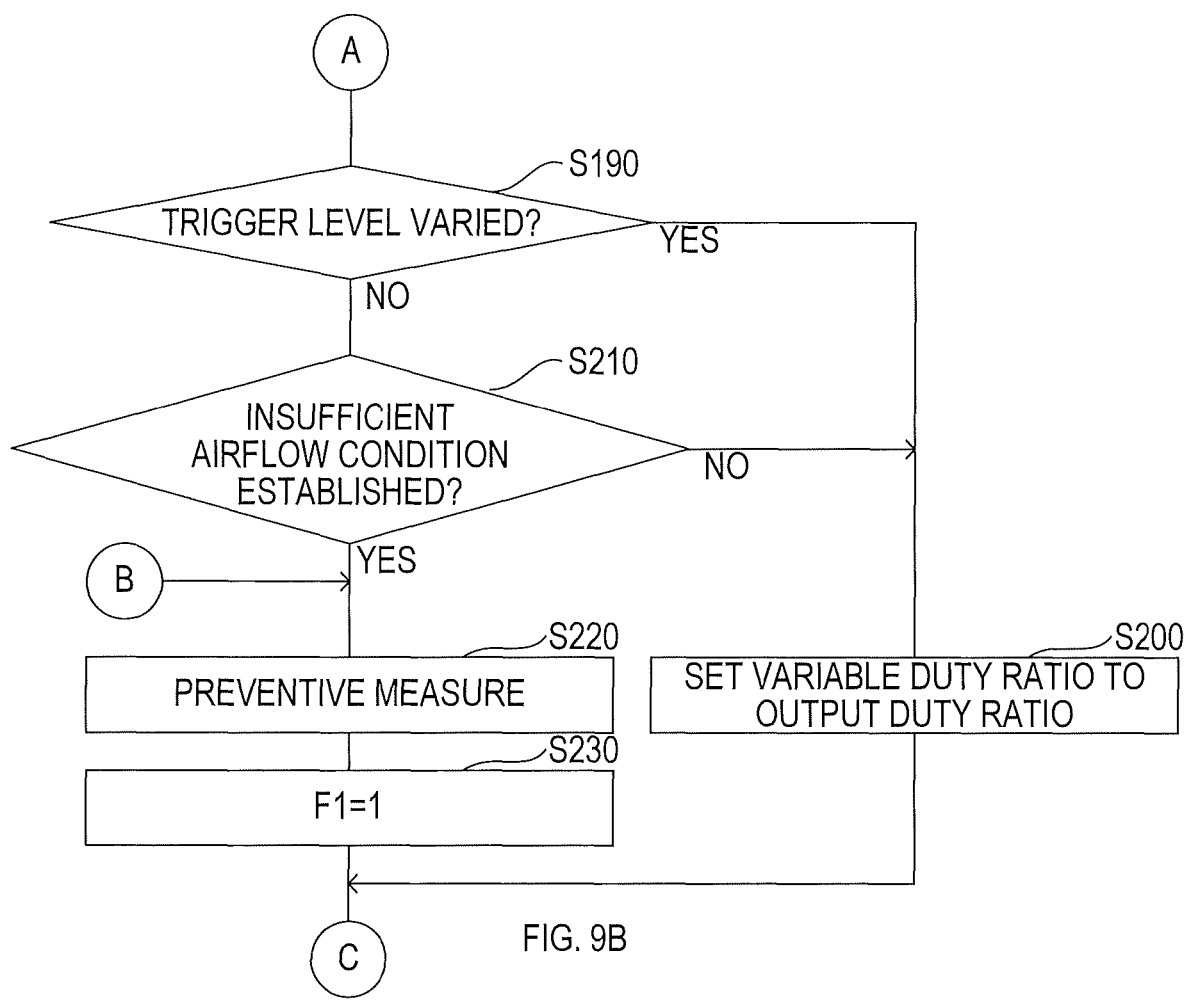
FIG. 9B is a flow chart showing a flow of the rest of the motor control process.

As shown in FIGS. 9A and 9B, upon the initiation of the motor control process, the CPU 61, in S110, calculates the actual rotational frequency of the motor 41 based on the rotational frequency signal output from the rotational frequency detection circuit 45 and stores the calculated actual rotational frequency in the RAM 63.

Subsequently, in S120, the CPU 61 determines whether the trigger switch 37 is in the ON state. If the trigger switch 37 is in the OFF state (S120: NO), the CPU 61, in S130, clears an insufficient airflow detection flag F1, which is stored in the RAM 63, and finishes the motor control process. The insufficient airflow detection flag F1 indicates whether an insufficient airflow from the two or more first suction ports 13a to the first discharge port 12a (or an insufficient air around the fan 32) is detected. In the present embodiment, a state in which the insufficient airflow detection flag F1 is cleared means that the insufficient airflow is not detected, whereas a state in which the insufficient airflow detection flag F1 is set means that the insufficient airflow is detected.

If the trigger switch 37 is in the ON state in S120 (S120: YES), the CPU 61, in S140, determines whether the trigger switch 37 is switched from the OFF state to the ON state. If the trigger switch 37 is not switched from the OFF state to the ON state (S140: NO), the CPU 61 proceeds to a process of S160.

If the trigger switch 37 is switched from the OFF state to the ON state (S140: YES), the CPU 61, in S150, sets a variable duty ratio stored in the RAM 63 to an initial value and proceeds to the process of S160. The initial value is predetermined.

Figure 10:
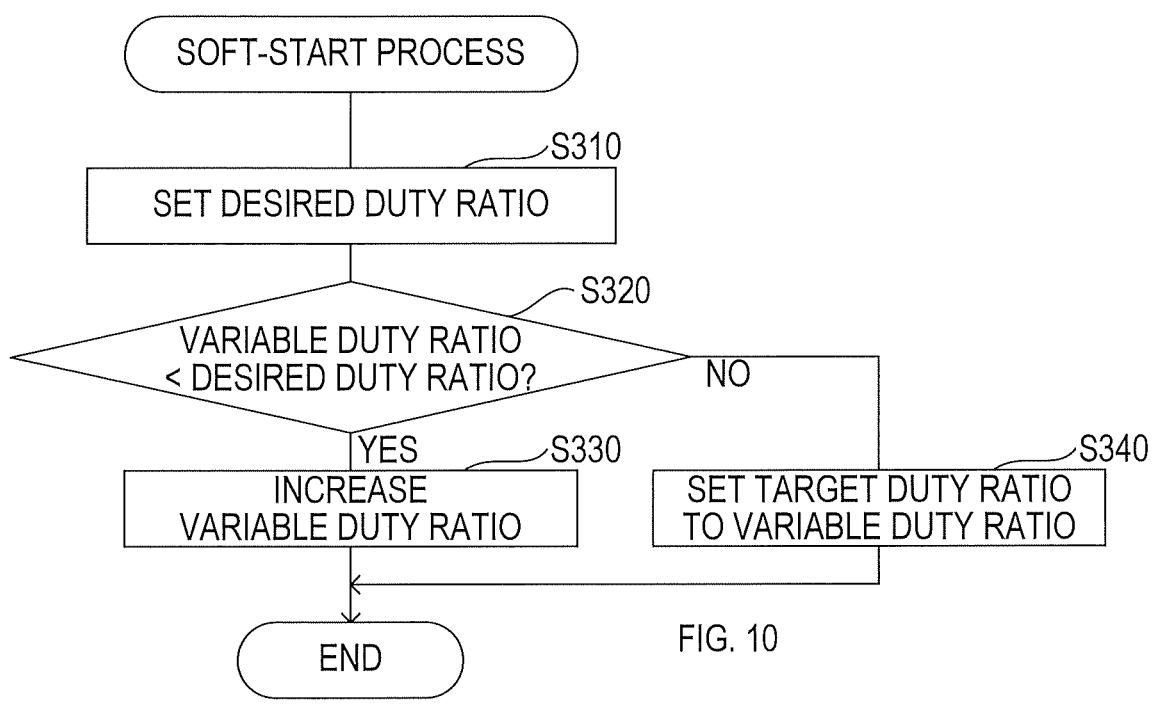
FIG. 10 is a flow chart showing a flow of a soft-start process.

In S160, the CPU 61 executes a soft-start process shown in FIG. 10.

As shown in FIG. 10, upon the initiation of the soft-start process, the CPU 61, in S310, sets a desired duty ratio (or a target duty ratio) stored in the RAM 63 to a value that corresponds to the current trigger level and the selected operation mode.

In the present embodiment, the trigger level is set at any one of twenty-one levels (namely, levels ranging from level 0 through level 20). Specifically, level 0 corresponds to a non-pulled distance in which the trigger 6 is not pulled at all or to a small pulled distance considered as equivalent to the non-pulled distance. Level 20 corresponds to the maximum pulled distance of the trigger 6. In other embodiments, the trigger level may be set at any one of twenty or less of the levels, or at any one of twenty-two or more of the levels.

In the present embodiment, the operation modes of the blower 1 includes first- through fourth-speed modes. Every time the mode changeover switch 9 is manually operated, the CPU 61 switches the operation modes in a cyclic manner in the order of the first-speed mode, the second-speed mode, the third-speed mode, the fourth-speed mode, and back to the first-speed mode. In the first-speed mode, the maximum rotational frequency of the motor 41 is set at the lowest among the first- through fourth-speed modes. In the fourth-speed mode, the maximum rotational frequency of the motor 41 is set at the highest among the first-through fourth-speed modes. In other embodiments, the operation modes may include three or less of the speed modes or five or more of the speed modes.

Figure 11:
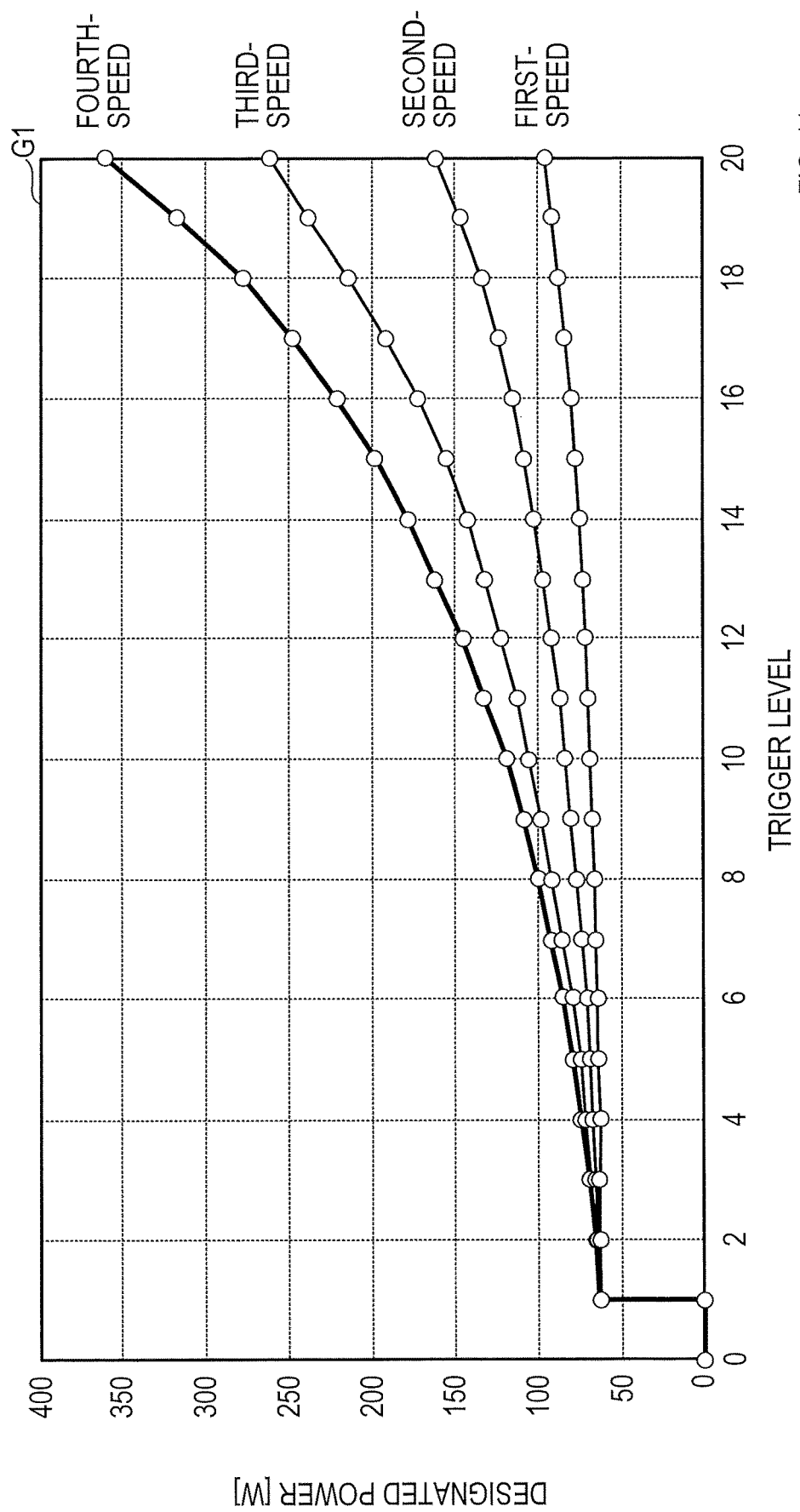
FIG. 11 is a graph showing a relation between a trigger level and a designated power.

As shown in Graph G1 in FIG. 11, the maximum value of the designated power (that is, the magnitude of the designated power at the time when the trigger level is at level 20) directed to the motor drive circuit 44 is individually set with respect to each of the first-through fourth-speed modes.

In each operation mode, the designated power is set so as to be increased as the trigger level goes higher. The designated power associated with each trigger level is the smallest in the first-speed mode and is the largest in the fourth-speed mode (specifically, the first-speed mode<the second-speed mode<the third-speed mode<the fourth-speed mode).

The desired duty ratio is associated with the magnitude of the designated power. As exemplified by Graph G1, in response to the fourth-speed mode being selected and the trigger level being set at level 8, the CPU 61 sets the desired duty ratio to a value associated with 100 watts of the designated power.

Referring back to FIG. 10, upon the completion of the process of S310, the CPU 61, in S320, determines whether the variable duty ratio is smaller than the desired duty ratio.

If the variable duty ratio is smaller than the desired duty ratio (S320: YES), the CPU 61, in S330, adds a first correction value, which is preset, to the variable duty ratio to thereby increase the variable duty ratio and finishes the soft-start process.

If the variable duty ratio, in S320, is equal to or greater than the desired duty ratio (S320: NO), the CPU 61, in S340, sets the desired duty ratio to the variable duty ratio and finishes the soft-start process.

Referring back to FIGS. 9A and 9B, upon the completion of the soft-start process (S160), the CPU 61, in S170, executes an overspeed suppression process.

Figure 12:
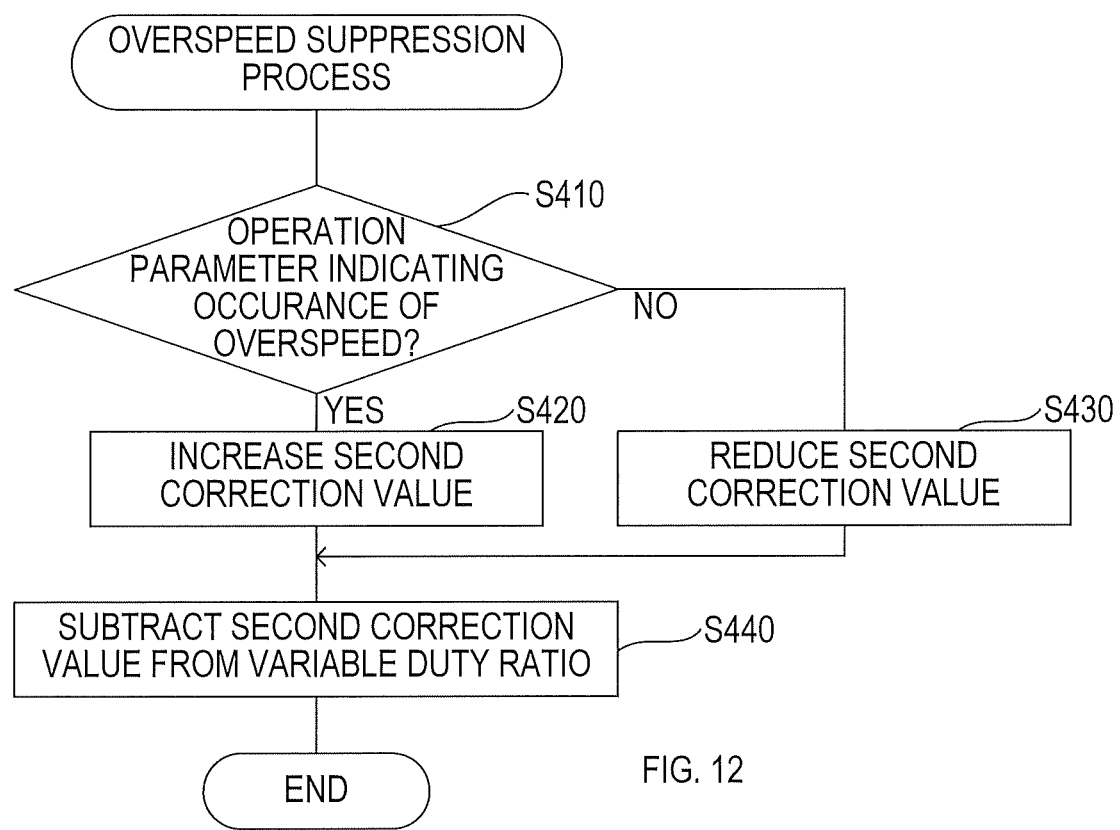
FIG. 12 is a flow chart showing a flow of an overspeed suppression process.

As shown in FIG. 12, upon the initiation of the overspeed suppression process, the CPU 61, in S410, compares an operation parameter with a reference value to thereby determine whether the operation parameter indicates an occurrence of an overspeed. The operation parameter is one or more parameters associated with the operation of the motor 41. The reference value in the present embodiment is an operation parameter that corresponds to the maximum rotational frequency (for example, 80,000 rpm) permissible to the motor 41. In the present embodiment, the operation parameter is the actual rotational frequency of the motor 41. In other embodiments, the operation parameter may include, in addition to or in place of the actual rotational frequency, the magnitude of the drive current and/or the drive duty ratio.

If the operation parameter indicates the occurrence of the overspeed (S410: YES), the CPU 61, in S420, adds an increment value, which is preset, to a second correction value stored in the RAM 63 to thereby increase the second correction value and then proceeds to a process of S440.

If the operation parameter does not indicate the occurrence of the overspeed (S410: NO), the CPU 61, in S430, subtracts a decrement value, which is preset, from the second correction value to thereby reduce the second correction value and then proceeds to the process of S440. In the present embodiment, the second correction value is equal to or greater than zero. Thus, in a case where a value obtained by subtracting the decrement value from the second correction value is smaller than zero (i.e. a negative value), the CPU 61 sets the second correction value to zero.

In S440, the CPU 61 subtracts the second correction value from the variable duty ratio to thereby reduce the variable duty ratio and then finishes the overspeed suppression process.

Referring back to FIGS. 9A and 9B, upon the completion of the overspeed suppression process (S170), the CPU 61, in S180, determines whether the insufficient airflow detection flag F1 is set. If the insufficient airflow detection flag F1 is cleared (S180: NO), the CPU 61, in S190, determines whether the trigger level has varied.

If the trigger level has varied (S190: YES), the CPU 61, in S200, sets the variable duty ratio to an output duty ratio of the power designating signal, outputs the power designating signal and then finishes the motor control process.

If the trigger level has not varied (S190: NO), the CPU 61, in S210, determines whether an insufficient airflow condition, which is predetermined, is established. In the present embodiment, the insufficient airflow condition is established when a variation in the operation parameter at the current period of time relative to the operation parameter prior to a specified period of time is equal to or greater than a predetermined threshold. In the present embodiment, the insufficient airflow condition is established when an increase in the actual rotational frequency is equal to or greater than the threshold. In other embodiments, the insufficient airflow condition may be established when a decrease in the drive current and/or an increase in the drive duty ratio, in addition to or in place of the increase in the actual rotational frequency, are/is equal to or greater than the corresponding thresholds/threshold.

If the insufficient airflow condition is not established (S210: NO), the CPU 61 proceeds to the process of S200. If the insufficient airflow condition is established (S210: YES), the CPU 61, in S220, performs a preventive measure for suppressing a failure in the motor 41. In the present embodiment, the CPU 61, in S220, sets the output duty ratio to a fixed duty ratio, which is preset to protect the motor 41, and outputs the power designating signal having such an output duty ratio. In other embodiments, the CPU 61, in S220, may stop the motor 41, may notify the user via the mode indicator 10 that the insufficient airflow has been detected, or may set the blower 1 to an operation mode, such as the first-speed mode or the second-speed mode, in which the maximum rotational frequency of the motor 41 is low. Upon completion of the process of S220, the CPU 61, in S230, sets the insufficient airflow detection flag F1 and then finishes the motor control process.

If the insufficient airflow detection flag F1 is set in S180 (S180: YES), the CPU 61, in S240, determines whether the fixed duty ratio is greater than the variable duty ratio.

If the fixed duty ratio is equal to or less than the variable duty ratio (S240: NO), the CPU 61 proceeds to the process of S220.

If the fixed duty ratio is greater than the variable duty ratio (S240: YES), the CPU 61, in S250, sets the variable duty ratio to the output duty ratio of the power designating signal and outputs, to the motor drive circuit 44, the power designating signal having such an output duty ratio. Subsequently, in S260, the CPU 61 clears the insufficient airflow detection flag F1 and then finishes the motor control process.

2-4. Summary of Operation

Figure 13A:
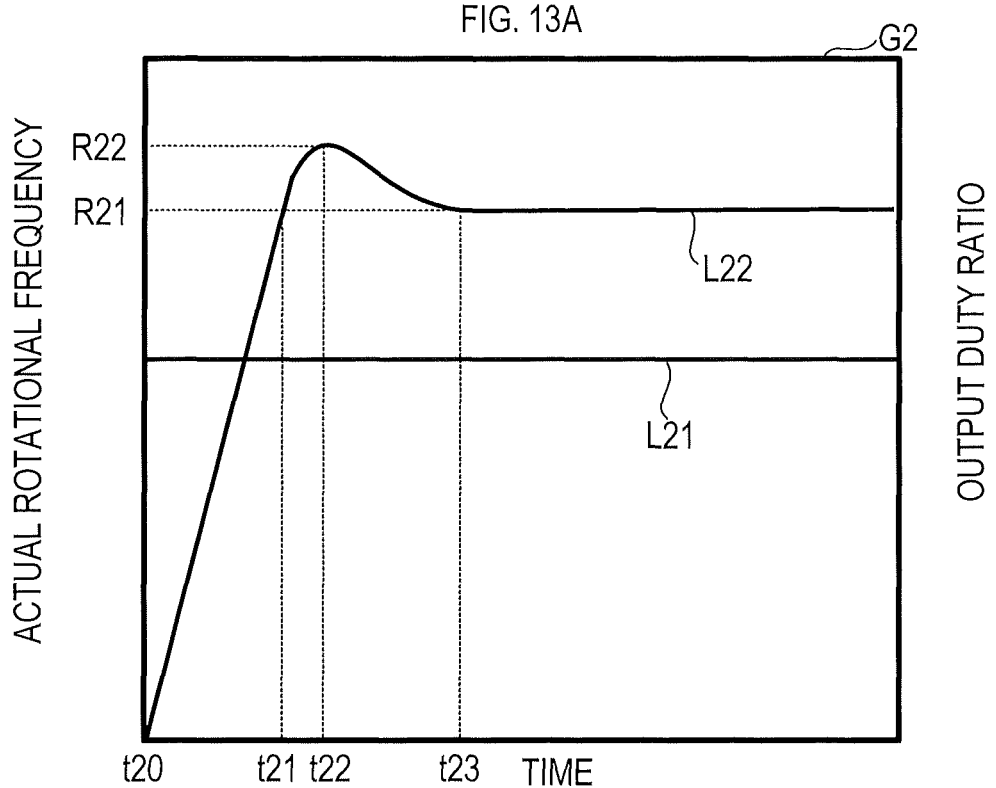
FIGS. 13A and 13B each show a graph indicating respective variations in an actual rotational frequency and in an output duty ratio over time.

Graph G2 in FIG. 13A indicates a variation in the actual rotational frequency over time, when the power designating signal having the output duty ratio in accordance with the trigger level is output without the soft-start process being executed. Solid line L21 in Graph G2 indicates a variation in the output duty ratio over time. Solid line L22 in Graph G2 indicates the variation in the actual rotational frequency over time.

As shown in Graph G2, in this example, in response to the trigger 6 started to be pulled at Time t20, the actual rotational frequency abruptly increases. The actual rotational frequency exceeds an upper-limit rotational frequency R21 at Time t21 and reaches a peak rotational frequency R22 at Time t22. The actual rotational frequency decreases thereafter and converges to the upper-limit rotational frequency R21 at and after Time t23. The reason the actual rotational frequency converges to the upper-limit rotational frequency R21 is that an overspeed suppression function equipped on the motor unit 31 is activated.

Figure 13B:
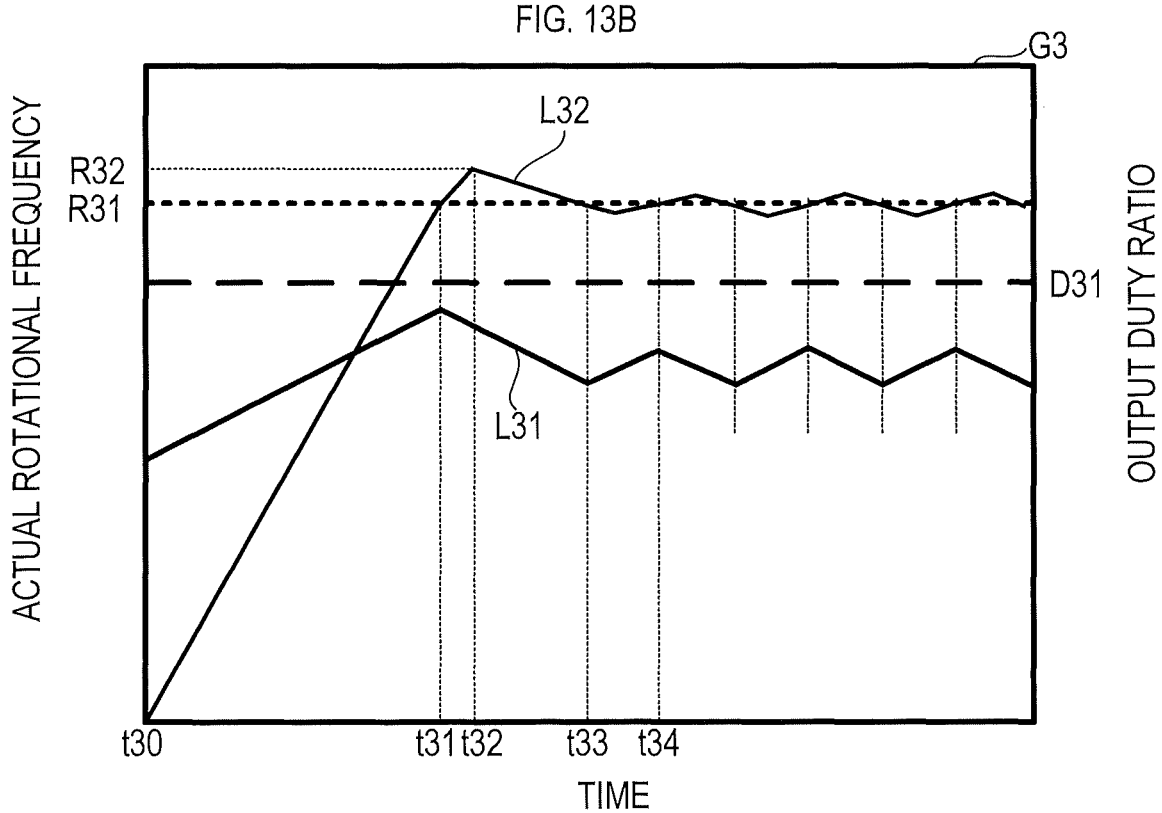

Graph G3 in FIG. 13B indicates respective variations in the output duty ratio and in the actual rotational frequency over time in the blower 1 of the present embodiment.

In the blower 1, in response to the trigger 6 started to be pulled while the motor 41 is stopped, the soft-start process is executed and the output duty ratio gradually increases. Solid line L31 in Graph G3 indicates a variation in the output duty ratio over time. Solid line L32 in Graph G3 indicates a variation in the actual rotational frequency over time.

As shown in Graph G3, in response to the trigger 6 started to be pulled at Time t30, the output duty ratio gradually increases toward a desired duty ratio D31. Subsequently, the actual rotational frequency exceeds an upper-limit rotational frequency R31 at Time t31. In response to the actual rotational frequency having exceeded the upper-limit rotational frequency R31, the output duty ratio turns from increasing to decreasing at Time t31 when the output duty ratio does not yet reach the desired duty ratio D31. Consequently, the actual rotational frequency reaches a peak rotational frequency R32 at Time t32 and decreases thereafter.

In response to the actual rotational frequency having fallen below the upper-limit rotational frequency R31 at Time t33, the output duty ratio turns from decreasing to increasing. In response to the actual rotational frequency having reached the upper-limit rotational frequency R31 at Time t34, the output duty ratio turns from increasing to decreasing. The output duty ratio repeats increasing and decreasing in this way, and the actual rotational frequency converges to the upper-limit rotational frequency R31.

The blower 1 of the present embodiment executes the soft-start process and the overspeed suppression process, as shown in Graph G3 in FIG. 13B, whereby an overshoot of the actual rotational frequency (that is, an error between the peak rotational frequency R32 and the upper-limit rotational frequency R31) can be minimized.

In the present embodiment, the actual rotational frequency in the blower 1 needs to be high so that a sufficient airflow can be generated solely by the single fan 32. Accordingly, the actual rotational frequency is slightly lower than the reference value (for example, 80,000 rpm). In other words, the actual rotational frequency easily exceeds the reference value. Thus, the blower 1 can effectively suppress the failure in the motor 41 through the overspeed suppression process.

Figure 14:
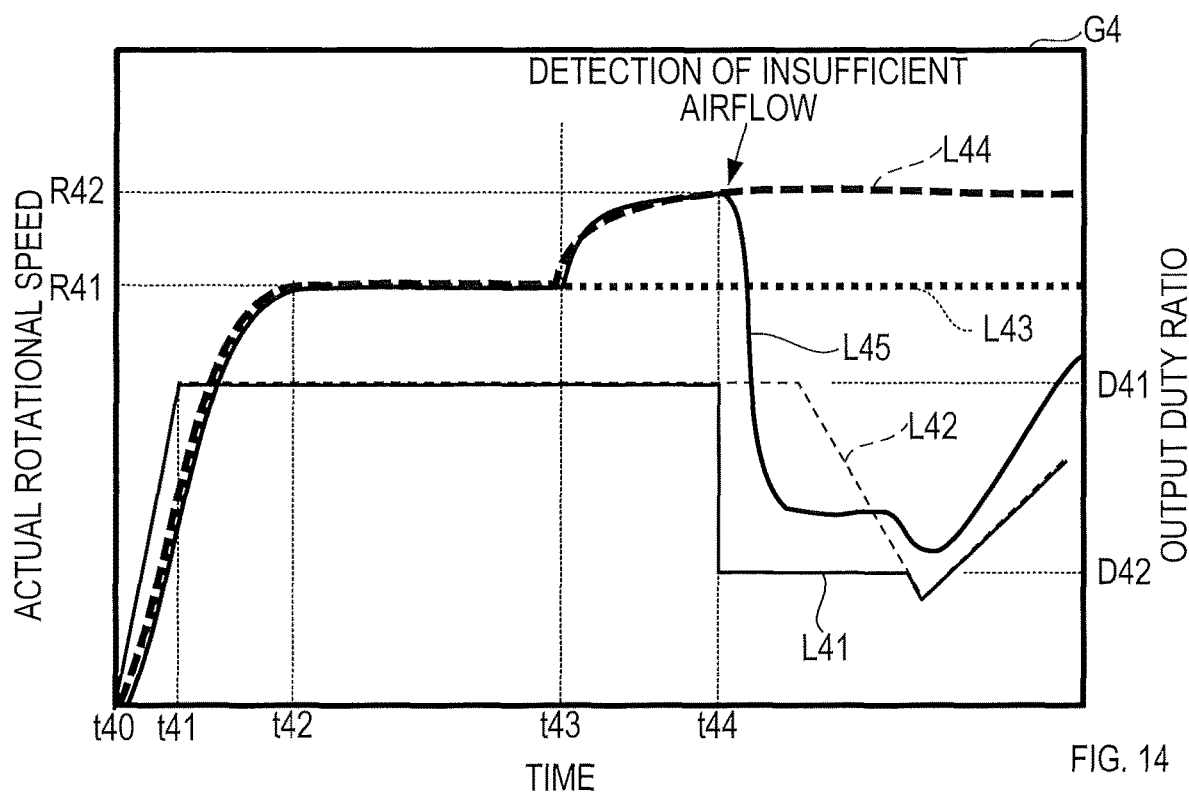
FIG. 14 shows a graph to explain a detection of an insufficient airflow.

Graph G4 shown in FIG. 14 indicates respective variations in the output duty ratio and in the actual rotational frequency over time, in a case where the air suction hose 22 is attached to the suction portion 13 as shown in FIG. 4, and an air is drawn from a pneumatically inflated structure. In a case where an air is drawn from a pneumatically inflated structure in this way, when the air is completely evacuated from the pneumatically inflated structure, no air is introduced into the housing 4 through the two or more first suction ports 13a, resulting in a circumstance similar to that in which the two or more first suction ports 13a are completely closed. If the motor 41 is kept operating under such a circumstance, a temperature of the motor 41 can exceed a permissible operating temperature, and the motor 41 can fail.

Solid line L41 in Graph G4 indicates a variation in the output duty ratio over time, in a case where the insufficient airflow condition is established and the protection of the motor 41 is performed. Dotted line L42 indicates a variation in the trigger level over time. Dotted line L43 indicates a variation in the actual rotational frequency over time, in a case where the insufficient airflow condition is not established. Dotted line L44 indicates a variation in the actual rotational frequency over time, in a case where the insufficient airflow condition is established. Solid line L45 indicates a variation in the actual rotational frequency over time, in a case where the insufficient airflow condition is established and the protection of the motor 41 is performed.

As shown in Graph G4, the trigger 6 starts to be pulled at Time t40, and the trigger level gradually increases until Time t41. The trigger level is maintained thereafter.

With the variation in the trigger level as described above, the output duty ratio starts to gradually increase, at Time t40, in accordance with the trigger level, and reaches a duty ratio D41 at Time t41. The output duty ratio is maintained at the duty ratio D41 thereafter.

The actual rotational frequency starts to gradually increase at Time t40, and reaches a rotational frequency R41 at Time t42. The actual rotational frequency is maintained at the rotational frequency R41 thereafter.

In response to the insufficient airflow having occurred at Time t43, the actual rotational frequency increases despite that the trigger level and the output duty ratio are not varying.

Subsequently, in response to the insufficient airflow having been detected at Time t44 when the actual rotational frequency reaches a rotational frequency R42, the output duty ratio rapidly decreases from the duty ratio D41 to a duty ratio D42, as indicated by Solid line L41. Consequently, as indicated by Solid line L45, the actual rotational frequency rapidly decreases and the failure in the motor 41 can be suppressed.

In the blower 1 configured as mentioned above, when a pressure loss (or a pressure drop) is generated with respect to an airflow passing through (i) the first discharge port 12a, or (ii) the first discharge port 12a and the second discharge port 21a, a pressure of an air downstream from the first discharge port 12a and/or the second discharge port 21a decreases. In response to the pressure of the air downstream decreasing, a load applied from the fan 32 to the motor 41 also decreases. In such a circumstance, the magnitude of the electric power delivered to the motor 41 is maintained, through the constant power control, at the magnitude designated and the actual rotational frequency of the motor 41 therefore increases. In response to the actual rotational frequency increasing, the flow rate of the air increases. Consequently, the blower 1 can suppress a decrease in the flow rate of the air discharged from the blower 1 with the attachment 21 attached thereto.

The blower 1 allows the user to vary the magnitude of the electric power delivered to the motor 41 with the movement of the trigger 6 to thereby vary the flow rate of the air discharged from the blower 1.

In the blower 1, since the maximum values of the designated power are individually set with respect to the first-through fourth-speed modes respectively, it is possible to vary a maximum flow rate of the air discharged from the blower 1 in response to the selected operation mode.

In the blower 1, the control circuit 51 can be arranged apart from the motor drive circuit 44. Thus, it is possible to inhibit the control circuit 51 from receiving an electromagnetic interference that is generated by the drive current flowing from the motor drive circuit 44 to the motor 41.

In the blower 1, in response to the actual rotational frequency of the motor 41 having reached the maximum rotational frequency permissible to the motor 41, the magnitude of the designated power is reduced and the actual rotational frequency consequently decreases. As a result, a failure in the motor 41 due to the overspeed of the motor 41 can be suppressed.

In the blower 1, the opening area of the second discharge port 21a in the attachment 21 is smaller than the opening area of the first discharge port 12a. Therefore, the blower 1 is useful to discharge the airflow to a limited space outside the blower 1.

2-5. Correspondence Between Terms

In the embodiment described above, a combination of the trigger 6 with the trigger switch 37 corresponds to one example of the first manual switch in the overview of embodiments, and the mode changeover switch 9 corresponds to one example of the second manual switch in the overview of embodiments. The battery 36 corresponds to one example of the power source in the overview of embodiments, and the battery attachment part 7 corresponds to one example of the power source fitting portion in the overview of embodiments.

2-6. Variations

In the above embodiment, the motor drive circuit 44 may be configured not to perform the constant power control. In such a case, in response to the occurrence of the overspeed of the motor 41, the magnitude of the drive current can decrease to the reference value or less. Accordingly, the control circuit 51 may determine, in S410 shown in FIG. 12, that the operation parameter indicates the occurrence of the overspeed, in response to the magnitude of the drive current being equal to or less than the corresponding reference value. The control circuit 51 may determine, in S210 shown in FIG. 9B, that the insufficient airflow condition is established when the variation (i.e. the decrease) in the magnitude of the drive current at the current period of time relative to the magnitude of the drive current prior to a specified period of time is equal to or greater than the corresponding threshold.

In the above embodiment, the magnitude of the designated power may be fixed.

In the above embodiment, the blower 1 may be a non-handheld blower.

2-7. Complementary Description

Two or more functions of a single element in the above embodiments may be achieved by two or more elements, or a single function of a single element may be achieved by two or more elements. Two or more functions of two or more elements in the above embodiments may be achieved by a single element, or a single function achieved by two or more elements may be achieved by a single element. A part of the configurations of the above embodiments may be omitted. At least a part of the configuration(s) of one embodiment described above may be added to or replaced with the configuration(s) of another embodiment described above.

Besides the blower 1 as described above, the present disclosure can be implemented in various forms including a system that includes the blower 1, a program for functioning a computer as a part of the blower 1, a non-transitory tangible storage medium, such as a semiconductor memory, storing such a program, and a controlling method.

What is claimed is:

1. A handheld blower comprising:
a housing including a suction port; a first discharge port; and an attachment fitting portion, the suction port and the first discharge port communicating an inside of the housing with an outside of the housing, the first discharge port having an opening area of a first magnitude, the attachment fitting portion being configured to detachably attach an attachment to the first discharge port, the attachment (i) being in the form of a nozzle, (ii) including a second discharge port, and (iii) being configured to receive an airflow discharged through the first discharge port and to discharge the airflow through the second discharge port, the second discharge port having an opening area of a second magnitude, and the second magnitude being smaller than the first magnitude;
a motor in the housing;
a fan (i) in the housing and (ii) configured to be rotationally driven by the motor to thereby generate the airflow to be discharged through the first discharge port;
a trigger configured to be pulled by a user of the blower;
a control circuit programmed to:
set an output duty ratio based on a trigger level, wherein the trigger level corresponds to a pulled distance of the trigger; and
output a power designating signal having the output duty ratio; and
a motor drive circuit configured to:
receive the power designating signal;
deliver, to the motor, an electric power having a magnitude in accordance with the output duty ratio of the power designating signal received; and
perform a constant power control that maintains the magnitude of the electric power delivered to the motor at a magnitude corresponding to the output duty ratio.

2. A blower comprising:
a housing including a suction port and a first discharge port, the suction port and the first discharge port communicating an inside of the housing with an outside of the housing;
a motor in the housing;
a fan (i) in the housing and (ii) configured to be rotationally driven by the motor to thereby generate an airflow from the suction port to the first discharge port;
an attachment fitting portion configured to detachably attach an attachment to the first discharge port, the attachment (i) including a second discharge port and (ii) configured to receive the airflow discharged through the first discharge port and to discharge the airflow through the second discharge port; and
a motor drive circuit configured (i) to deliver a designated power to the motor and (ii) to perform a constant power control that maintains a magnitude of an electric power delivered to the motor at a magnitude of the designated power.

3. The blower according to claim 2, further comprising a control circuit configured to output a power designating signal, the power designating signal indicating the magnitude of the designated power, wherein the motor drive circuit is configured (i) to receive the power designating signal and (ii) to maintain, in the constant power control, the magnitude of the electric power delivered to the motor at the magnitude indicated by the power designating signal received.

4. The blower according to claim 3, further comprising a first manual switch configured to be manually moved by a user of the blower to drive the motor,
   wherein the control circuit is configured to vary the power designating signal in accordance with a movement of the first manual switch, and
   wherein the motor drive circuit is configured to vary the magnitude of the electric power delivered to the motor in accordance with a variation in the power designating signal.

5. The blower according to claim 4,
   wherein the power designating signal is in the form of a pulse width modulation signal having an output duty ratio,
   wherein the control circuit is configured to vary the output duty ratio in accordance with the movement of the first manual switch, and
   wherein the motor drive circuit is configured to vary the magnitude of the electric power delivered to the motor in accordance with a variation in the output duty ratio.

6. The blower according to claim 3, further comprising a second manual switch configured to be manually moved by a user of the blower to switch the blower between a first operation mode and a second operation mode,
   wherein the control circuit is configured to set a maximum value of the designated power to a first value in response to the blower having been switched to the first operation mode via the second manual switch, and
   wherein the control circuit is configured to set the maximum value of the designated power to a second value in response to the blower having been switched to the second operation mode via the second manual switch, the second value being distinct from the first value.

7. The blower according to claim 3, further comprising a power source fitting portion configured to be detachably attached to a power source, the power source having an electric power to be delivered to the motor,
   wherein the control circuit is accommodated in the power source fitting portion, and
   wherein the motor drive circuit is accommodated in the housing.

8. The blower according to claim 7,
   wherein the power source fitting portion is configured to be detachably attached to a battery pack including the power source.

9. The blower according to claim 3,
   wherein the control circuit is configured to vary the power designating signal so as to reduce the magnitude of the designated power in response to an operation parameter of the motor indicating that an actual rotational frequency of the motor has reached a preset rotational frequency.

10. The blower according to claim 9,
    wherein the preset rotational frequency corresponds to a maximum rotational frequency permissible to the motor.

11. The blower according to claim 10, further comprising a rotational frequency detection circuit configured to output a rotational frequency signal based on a rotation of the motor,
    wherein the rotational frequency signal varies in accordance with the actual rotational frequency of the motor,
    wherein the control circuit is configured (i) to receive the rotational frequency signal and (ii) to detect the actual rotational frequency based on the rotational frequency signal received, and
    wherein the operation parameter includes the actual rotational frequency.

12. The blower according to claim 11, further comprising a motor unit (i) in the housing and (ii) including the motor, the motor drive circuit, and the rotational frequency detection circuit.

13. The blower according to claim 2,
    wherein the attachment is in the form of a nozzle.

14. The blower according to claim 2,
    wherein the first discharge port has an opening area of a first magnitude,
    wherein the second discharge port has an opening area of a second magnitude, and
    wherein the second magnitude is smaller than the first magnitude.

15. The blower according to claim 2,
    wherein the blower is in the form of a handheld blower.

16. A method for operating a blower, comprising:
    attaching an attachment to a first discharge port of the blower, the attachment (i) including a second discharge port and (ii) configured to receive an airflow discharged through the first discharge port and to discharge the airflow through the second discharge port;
    delivering, to a motor of the blower, an electrical power having a magnitude designated by a user of the blower, the motor being configured to rotationally drive a fan of the blower; and
    performing a constant power control that maintains a magnitude of the electric power delivered to the motor at the magnitude designated by the user.

17. The method according to claim 16,
    wherein performing a constant power control that maintains a magnitude of the electric power delivered to the motor at the magnitude designated by the user includes:
    generating a switching signal base on (i) a value of a voltage, (ii) a value of an electric current, and (iii) the magnitude designated by the user, the voltage being applied to the motor, the electric current flowing through the motor; and
    delivering the switching signal to a bridge circuit, the bridge circuit being configured to drive the motor based on the switching signal delivered.

18. The blower according to claim 3,
    wherein the motor drive circuit includes:
    a voltage measurement circuit configured to measure a value of a voltage, the voltage being applied to the motor;
    a current measurement circuit configured to measure a value of an electric current, the electric current flowing through the motor;
    a multiplier configured to receive (i) the value of the voltage measured by the voltage measurement circuit and (ii) the value of the electric current measured by the current measurement circuit and to produce a product thereof, the product corresponding to the magnitude of the electric power delivered to the motor;
    a switching signal generator configured (i) to receive the product and the power designating signal and (ii) to generate a switching signal; and
    a bridge circuit configured (i) to receive the switching signal and (ii) to drive the motor based on the switching signal received.

19. The blower according to claim 18,
wherein the switching signal generator is configured to generate the switching signal such that an error between (i) the product and (ii) the magnitude of the designated power indicated by the power designating signal is minimized.

20. The blower according to claim 3, further comprising:
a first circuit board including the control circuit thereon; and
a second circuit board (i) including the motor drive circuit thereon and (ii) distinct from the first circuit board.

* * * * *